United States Patent
Wu et al.

(10) Patent No.: US 11,606,423 B2
(45) Date of Patent: Mar. 14, 2023

(54) METHOD, APPARATUS, DEVICE, AND STORAGE MEDIUM FOR RUNNING STAND-ALONE PROGRAM

(71) Applicant: TENCENT TECHNOLOGY (SHENZHEN) COMPANY LTD, Guangdong (CN)

(72) Inventors: Hai Jun Wu, Shenzhen (CN); Wan Ze Xiong, Shenzhen (CN); Jing Tian Li, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 17/338,108

(22) Filed: Jun. 3, 2021

(65) Prior Publication Data

US 2021/0297478 A1    Sep. 23, 2021

Related U.S. Application Data

(63) Continuation of application No. PCT/CN2020/092045, filed on May 25, 2020.

(30) Foreign Application Priority Data

May 30, 2019   (CN) .......................... 201910464785.0

(51) Int. Cl.
*H04L 67/104* (2022.01)
*A63F 13/34* (2014.01)
(Continued)

(52) U.S. Cl.
CPC ............ *H04L 67/104* (2013.01); *A63F 13/34* (2014.09); *A63F 13/42* (2014.09); *A63F 13/533* (2014.09);
(Continued)

(58) Field of Classification Search
CPC ................. H04L 67/104; H04L 67/131; H04L 67/306; H04L 69/22; A63F 13/34; A63F 13/42;
(Continued)

(56) References Cited

U.S. PATENT DOCUMENTS 9,292,307 B2 * 3/2016 Yamamoto ............. G06F 9/451
10,252,157 B2    4/2019 Lin et al.
(Continued)

FOREIGN PATENT DOCUMENTS

CN   106385621 A   2/2017
CN   108011951 A   5/2018
(Continued)

OTHER PUBLICATIONS

Chris Hoffman (NPL—"How to Use Steam In-Home Streaming," How-To Geek, retrieved from https://www.howtogeek.com/189601/how-to-use-steam-in-home-streaming/, retrieved on Jun. 9, 2022, published Jul. 10, 2017; Hof) (Year: 2017).*
(Continued)

*Primary Examiner* — Michael A Keller
(74) *Attorney, Agent, or Firm* — Sughrue Mion, PLLC

(57) ABSTRACT

A method for running a stand-alone program includes: running the stand-alone program in a first main program, and establishing a network connection between a first terminal and a second terminal through the first main program run in the first terminal and a second main program run in the second terminal; and transmitting, by the first terminal, image information to the second terminal and transmitting, by the second terminal, a second operation command to the first terminal, through the network connection. A first operation object and a second operation object in the stand-alone program are separately controlled.

20 Claims, 15 Drawing Sheets

(51) Int. Cl.
   *A63F 13/42*      (2014.01)
   *A63F 13/533*     (2014.01)
   *G06F 3/04842*    (2022.01)
   *H04L 67/306*     (2022.01)
   *H04L 67/131*     (2022.01)

(52) U.S. Cl.
   CPC ........ *G06F 3/04842* (2013.01); *H04L 67/131* (2022.05); *H04L 67/306* (2013.01); *A63F 2300/308* (2013.01); *A63F 2300/408* (2013.01); *A63F 2300/6045* (2013.01)

(58) Field of Classification Search
   CPC .............. A63F 13/533; A63F 2300/308; A63F 2300/408; A63F 2300/6045; A63F 13/355; A63F 13/77; A63F 13/847; G06F 3/04842; G06F 3/0487; G06F 3/1454
   See application file for complete search history.

(56) References Cited

U.S. PATENT DOCUMENTS

| | | | |
|---|---|---|---|
| 10,621,076 B2* | 4/2020 | Xu | G06F 11/2221 |
| 10,673,971 B1* | 6/2020 | Hindanov | H04L 67/60 |
| 2015/0238859 A1* | 8/2015 | Fear | A63F 13/35 463/31 |
| 2017/0095735 A1 | 4/2017 | Kondo et al. | |
| 2018/0234515 A1 | 8/2018 | Rombakh et al. | |
| 2018/0353855 A1* | 12/2018 | Niemeyer | G06F 3/04847 |
| 2019/0224568 A1* | 7/2019 | Yang | A63F 13/798 |
| 2021/0069590 A1* | 3/2021 | Peter | A63F 13/92 |

FOREIGN PATENT DOCUMENTS

| | | |
|---|---|---|
| CN | 110162255 A | 8/2019 |
| JP | 2008-12072 A | 1/2008 |
| JP | 2016-137250 A | 8/2016 |

OTHER PUBLICATIONS

Steamworks Documentation ("Added extended statuses," Steamworks Documentation, retrieved from https://web.archive.org/web/20190427145226/https://partner.steamgames.com/doc/features/enhancedrichpresence, published Dec. 21, 2018, wayback machine captured on Apr. 27, 2019, retrieved from wayback machine Jun. 9, 2022 (Year: 2018).*
Scott Brown ("Steam Link Anywhere on Android lets you play your Steam library, wee, anywhere," retrieved from https://www.androidauthority.com/steam-link-anywhere-965952/, retrieved on Jun. 7, 2022, published Mar. 14, 2019; Bro) (Year: 2019).*
International Search Report for PCT/CN2020/092045 dated Sep. 1, 2020.
Written Opinion for PCT/CN2020/092045 dated Sep. 1, 2020.
Chinese Office Action 201910464785.0 dated Mar. 8, 2021.
Extended European Search Report dated Jul. 7, 2022 from the European Patent Office in EP Application No. 20815547.3.
Communication dated Jul. 26, 2022 from the European Patent Office in EP Application No. 20815547.3.
Office Action dated Aug. 8, 2022 from the Japanese Patent Office in JP Application No. 2021-538795.
Office Action issued in Japanese Patent Application No. 2021-538795 dated Jan. 17, 2023.

\* cited by examiner

METHOD, APPARATUS, DEVICE, AND STORAGE MEDIUM FOR RUNNING STAND-ALONE PROGRAM

CROSS-REFERENCE TO RELATED APPLICATION(S)

This application is a bypass continuation application of International Application No. PCT/CN2020/092045, filed on May 25, 2020 and entitled "STANDALONE PROGRAM RUN METHOD, APPARATUS, DEVICE, AND STORAGE MEDIUM", which claims priority to Chinese Patent Application No. 201910464785.0, filed on May 30, 2019 with the National Intellectual Property Administration, PRC and entitled "METHOD, APPARATUS, DEVICE, AND STORAGE MEDIUM FOR RUNNING STAND-ALONE PROGRAM", the disclosures of which are herein incorporated by reference in their entireties.

FIELD

The disclosure relates to the field of computer technologies, and in particular, to a method, an apparatus, a device, and a storage medium for running a stand-alone program.

BACKGROUND

A stand-alone game is generally run independently in an electronic device even without being connected to a network. Some stand-alone games support a single-player mode and a multi-player mode. The single-player mode means that only one operation object may be controlled to operate in the stand-alone game. The multi-player mode means that at least two operation objects may be separately controlled to operate in the stand-alone game.

The operation object in the stand-alone game is controlled to operate through an input device of an electronic device. The multi-player mode of the stand-alone game may generally be controlled to operate through at least one input device. For example, a keyboard may be partitioned to control two operation objects in the stand-alone game, or two operating handles may be connected to the electronic device to separately control the two operation objects in the stand-alone game through the two handles.

However, the multi-player mode of the stand-alone game may be controlled to operate through only one electronic device, and cannot be controlled to operate through two or more electronic devices simultaneously.

SUMMARY

According to various example embodiments provided in the disclosure, a method, an apparatus, a device, and a storage medium for running a stand-alone program are provided. The technical solutions are as follows:

A method for running a stand-alone program, applicable to a first terminal running a first main program, includes:

running the stand-alone program in the first main program;

establishing a network connection to a second terminal through the first main program;

transmitting image information of the stand-alone program to the second terminal through the network connection;

receiving, through the first main program, a first operation command inputted through an input device of the first terminal, and transmitting the first operation command to the stand-alone program through the first main program; the stand-alone program being configured to control a first operation object in the stand-alone program according to the first operation command; and receiving, through the first main program, a second operation command from the second terminal through the network connection, and transmitting the second operation command to the stand-alone program through the first main program; the stand-alone program being further configured to control a second operation object in the stand-alone program according to the second operation command.

A method for running a stand-alone program, applicable to a second terminal running a second main program, includes:

establishing a network connection to a first terminal through the second main program;

receiving, through the second main program, image information of the stand-alone program that is from the first terminal through the network connection;

displaying the image information through the second main program; and receiving, through the second main program, a second operation command inputted through an input device of the second terminal, and transmitting the second operation command to the first terminal through the second main program; the second operation command being used by the stand-alone program to control a second operation object in the stand-alone program, and the stand-alone program being capable of separately controlling a first operation object and the second operation object.

An apparatus for running a stand-alone program, configured in a first terminal, includes;

at least one memory configured to store a first main program; and at least one processor configured to read the first main program and operate as instructed by the first main program, the first main program comprising:

program running code configured to cause the at least one processor to run the stand-alone program in the first main program;

network connecting code configured to cause the at least one processor to establish a network connection to a second terminal through the first main program;

network transmitting code configured to cause the at least one processor to transmit image information of the stand-alone program to the second terminal through the network connection;

receiving code configured to cause the at least one processor to receive, through the first main program, a first operation command inputted through an input device of the first terminal, and transmit the first operation command to the stand-alone program through the first main program, the stand-alone program being configured to control a first operation object according to the first operation command; and network receiving code configured to cause the at least one processor to receive, through the first main program, a second operation command from the second terminal through the network connection, and transmit the second operation command to the stand-alone program through the first main program, the stand-alone program being further configured to control a second operation object according to the second operation command.

An apparatus for running a stand-alone program, configured in a second terminal, includes;

at least one memory configured to store a second main program; and at least one processor configured to read the second main program and operate as instructed by the second main program, the second main program comprising:

network connecting code configured to cause the at least one processor to establish a network connection to a first terminal through the second main program;

network receiving code configured to cause the at least one processor to receive, through the second main program, image information of the stand-alone program that is from the first terminal through the network connection;

display code configured to cause the at least one processor to display the image information through the second main program; and network transmitting code configured to cause the at least one processor to receive, through the second main program, a second operation command inputted through an input device of the second terminal, and transmit the second operation command to the first terminal through the second main program, the second operation command being used by the stand-alone program to control a second operation object in the stand-alone program, the stand-alone program being capable of separately controlling a first operation object and the second operation object.

A terminal includes: one or more memories; and one or more processors connected to the one or more memories; the processors being configured to load and execute computer-readable instructions to implement the method for running a stand-alone program according to the various embodiments of the disclosure.

One or more non-transitory computer readable storage media storing at least one computer-readable instruction, the computer-readable instruction being loaded and executed by a processor to implement the method for running a stand-alone program according to the various embodiments of the disclosure.

Details of one or more embodiments of the disclosure are provided in the accompanying drawings and descriptions below. Based on the specification, the accompanying drawings, and the claims of the disclosure, other features, objectives, and advantages of the disclosure become clearer.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts.

DETAILED DESCRIPTION

In order to make objectives, technical solutions, and advantages of the disclosure clearer, implementations of the disclosure are further described in detail below with reference to the drawings. It is to be understood that the specific implementations described herein are merely used to explain the disclosure and are not used to limit the disclosure.

Terms in the disclosure are explained as follows:

Stand-alone program: It is a program that is generally run independently on an electronic device even without being connected to a network, such as a stand-alone game, which is a game that is run independently on an electronic device without being connected to a network. Some stand-alone games support a single-player mode and a multi-player mode. The single-player mode means that only one operation object may be controlled to operate in the stand-alone game. The multi-player mode means that at least two operation objects may be separately controlled to operate in the stand-alone game.

The operation object in the stand-alone game is controlled to operate through an input device of an electronic device. The multi-player mode of the stand-alone game may generally be controlled to operate through at least one input device. For example, a keyboard may be partitioned to control two operation objects in the stand-alone game, or two operating handles may be connected to the electronic device to separately control the two operation objects in the stand-alone game through the two handles.

Figure 1:
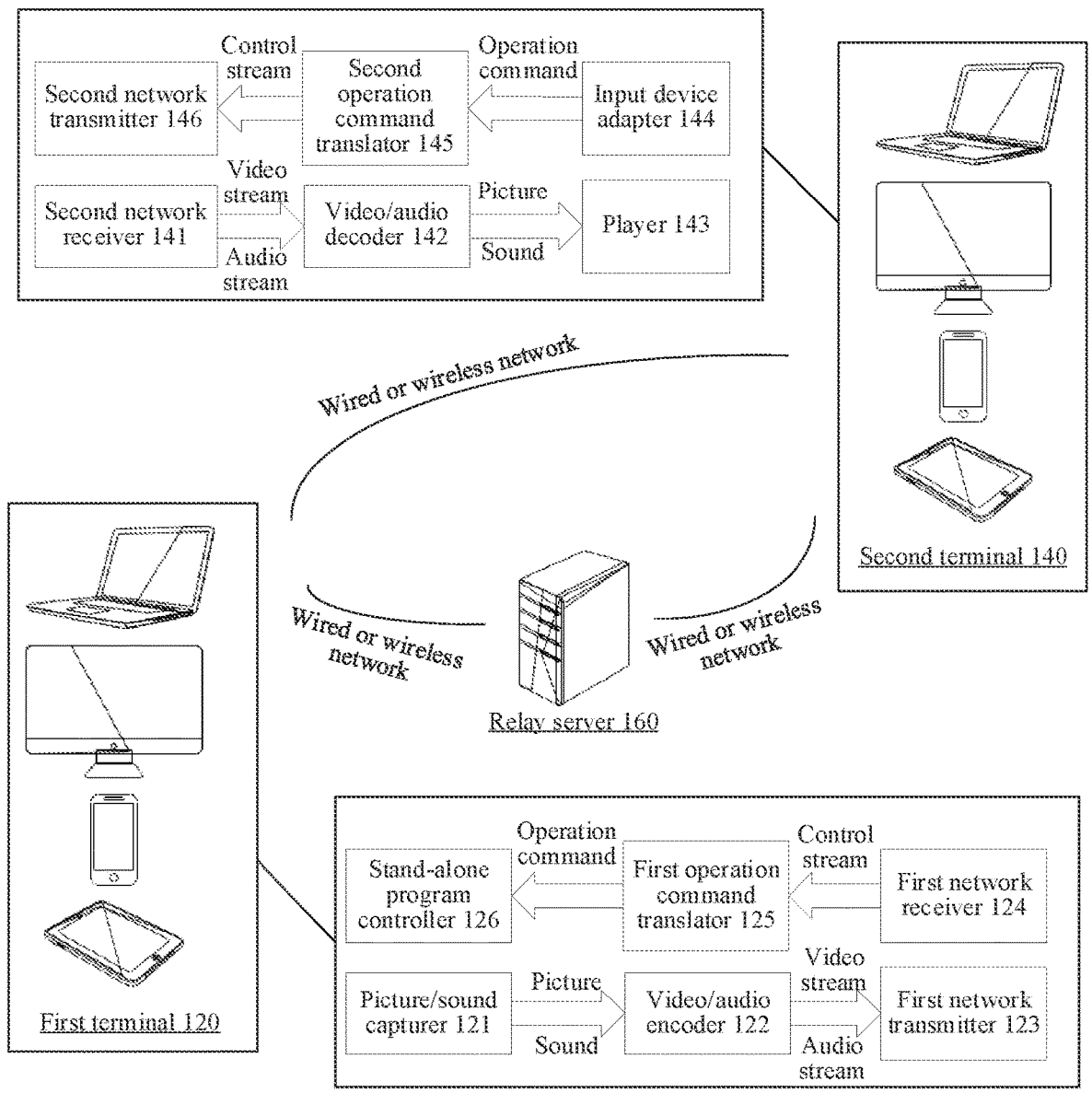
FIG. 1 is a schematic structural diagram of a computer system according to an example embodiment of the disclosure.

FIG. 1 is a block diagram of a computer system according to an example embodiment. The computer system includes a first terminal 120, a second terminal 140, and a relay server 160.

The first terminal 120 and the second terminal 140 may include at least one of a notebook computer, a desktop computer, a smart phone, and a tablet computer.

In an embodiment, the first terminal 120 establishes a peer-to-peer (P2P) network connection to the second terminal 140 through a wired or wireless network.

When an Internet Protocol (IP) address of the second terminal 140 is a public network IP, the first terminal 120 establishes a direct P2P connection to the second terminal 140.

When IP masking (network address translation, NAT) has been performed on the IP address of the second terminal 140, NAT penetration is performed between the first terminal 120 and the second terminal 140 to establish a direct P2P connection.

In an embodiment, the first terminal 120 establishes a network connection to the second terminal 140 through the relay server 160.

When NAT has been performed on the IP address of the second terminal 140 and NAT penetration cannot be performed between the first terminal 120 and the second terminal 140, a network connection is established between the first terminal 120 and the second terminal 140 through the relay server 160.

The relay server 160 communicates with the first terminal 120 and the second terminal 140 through a wired or wireless network.

An application program (a first main program) is installed in the first terminal 120, and the first main program is capable of running a stand-alone program. The stand-alone program is a program capable of controlling a first operation object and a second operation object separately. The first main program is further capable of running a multi-player program. For example, the first main program is further capable of running a network game.

In an embodiment, the first main program may be a multi-player program. The first main program is further capable of separately controlling the first operation object and the second operation object in the stand-alone program through the first terminal 120 and the second terminal 140. In this case, the stand-alone program is run in the first terminal 120.

An application program (a second main program) is installed in the second terminal 140, and the second terminal 140 may separately control the first operation object and the second operation object in the stand-alone program through the second main program and the first terminal 120 running the stand-alone program.

In an embodiment, the second main program may be capable of running the stand-alone program, or may be incapable of running the stand-alone program. The stand-alone program is a program capable of controlling a first operation object and a second operation object separately. In an example, the second terminal 140 is incapable of running the stand-alone program, and the second terminal 140 may receive and play, through the second main program, image information and sound information transmitted by the first terminal 120, receive, through the second main program, an operation command inputted through an input device of the second terminal 140, and transmit the operation command to the first terminal 120 through the second main program.

In an embodiment, the second main program may be a multi-player program or a browser. The multi-player program is capable of running the stand-alone program. The browser may be capable of running the stand-alone program, or may be incapable of running the stand-alone program.

As shown in FIG. 1, a multi-player program is installed in the first terminal 120. The second terminal 140 includes a terminal in which a multi-player program and a browser are installed.

The multi-player program in the first terminal 120 includes a picture/sound capturer 121, a video/audio encoder 122, a first network transmitter 123, a first network receiver 124, a first operation command translator 125, and a stand-alone program controller 126.

In the first terminal 120, the picture/sound capturer 121 captures and transmits image information and sound information during running of the stand-alone program to the video/audio encoder 122, and the video/audio encoder 122 encodes the image information and the sound information to obtain an encoded video stream and an encoded audio stream, and transmits the video stream and the audio stream to the second terminal 140 through the first network transmitter 123.

The receiver 124 receives a control stream transmitted by the second terminal 140, deserializes the control stream through the first operation command translator 125 to obtain a deserialized second operation command, then transmits the deserialized second operation command to the stand-alone program through the stand-alone program controller 126, and controls the second operation object according to the second operation command through the stand-alone program.

In an embodiment, the first terminal 120 further receives, through the multi-player program, a first operation command inputted through an input device of the first terminal 120, transmits the first operation command to the stand-alone program through the stand-alone program controller 126, and controls the first operation object according to the first operation command through the stand-alone program.

In some embodiments, the multi-player program in the second terminal 140 includes a second network receiver 141, a video/audio decoder 142, a player 143, an input device adapter 144, a second operation command translator 145, and a second network transmitter 146.

In the second terminal 140, the second network receiver 141 receives the video stream and the audio stream transmitted by the first terminal 120, and decodes the video stream and the audio stream through the video/audio decoder 142 to obtain decoded image information and sound information, and transmits the image information and the sound information to the player 143 for playing.

The second terminal 140 receives the second operation command inputted through the input device of the second terminal 140, obtains the second operation command through the input device adapter 144, inputs the second operation command to the second operation command translator 145 for serialization to obtain a control stream, and transmits the control stream to the first terminal 120 through the second network transmitter 146.

In some embodiments, the second terminal 140 includes a browser. The browser includes a JavaScript software development kit (SDK).

In the second terminal 140, the video stream and the audio stream transmitted by the first terminal 120 are received through a network protocol and are played through corresponding controls. For example, a video is played through hyper text markup language 5 video (HTML5 video) and an audio is played through hyper text markup language 5 audio (HTML5 audio), or the video and the audio are played through flash.

After the second terminal 140 receives the second operation command inputted through the input device of the second terminal 140, j s code on a page of the browser captures the second operation command, serializes the second operation command in the same manner as the second operation command translator 145, and transmits a serialized control stream to the first terminal 120 through the network protocol.

Figure 2:
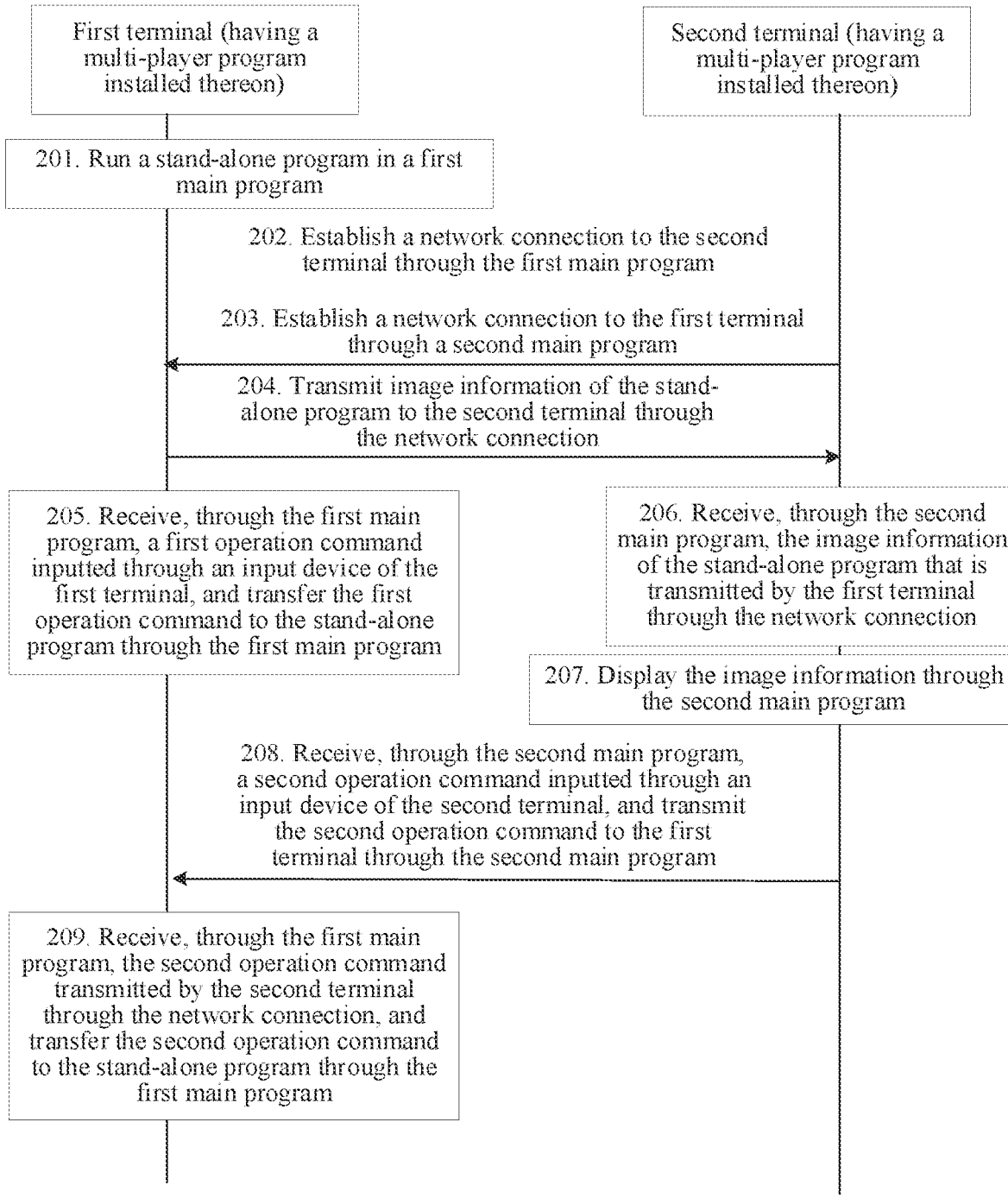
FIG. 2 is a flowchart of a method for running a stand-alone program according to an example embodiment of the disclosure.

FIG. 2 is a flowchart of a method for running a stand-alone program according to an example embodiment of the disclosure. For example, the method is applicable to the computer system shown in FIG. 1. When a first main program is installed in the first terminal and a second main program is installed in the second terminal, the method includes the following operations:

Operation 201: Run, at the first terminal, the stand-alone program in the first main program.

Operation 202: The first terminal establishes a network connection to the second terminal through the first main program.

The first main program is logged in to with a first account. The first account may include a friend list. The first terminal establishes a network connection to the second terminal through the first main program by using, for example but not limited to, the following operations:

1): Display the friend list in the first terminal, the friend list including at least one social friend (e.g., user who is registered as a social friend), including a social friend that corresponds to a second account.

2): The first terminal receives a selection operation on the friend list.

3): The first terminal determines a target second account according to the selection operation.

4): The first terminal establishes a network connection to the second terminal logged in to with the target second account.

In an embodiment, the first terminal establishes a direct peer-to-peer connection to the second terminal logged in to with the target second account. Alternatively, the first terminal establishes, through a relay server, the network connection to the second terminal logged in to with the target second account.

Operation 203: The second terminal establishes a network connection to the first terminal through the second main program.

The second main program is logged in to with a second account. The second account includes a friend list, and the friend list includes a social friend corresponding to the first account.

The second terminal establishes, through the second main program, a direct peer-to-peer connection to the first terminal logged in to with the first account. Alternatively, the second terminal establishes, through a relay server, the network connection to the first terminal logged in to with the first account.

Operation 204: The first terminal transmits image information of the stand-alone program to the second terminal through the network connection.

The first main program includes a video encoder and a first network transmitter. The first terminal transmits the image information of the stand-alone program to the second terminal through the network connection by using, for example but not limited to, the following operations:

1): The first terminal obtains the image information in a display interface.

In an embodiment, the image information includes a played picture of the stand-alone program or a desktop of an operating system. The first terminal obtains each frame of the stand-alone program in a current picture. In an embodiment, image capture is to hook a stand-alone program drawing interface or a graphics drawing application programming interface (API) of the operating system to capture the image information of the stand-alone program.

2): The first terminal encodes the image information through the video encoder to obtain encoded image information.

The first terminal encodes each obtained frame of the picture into a video frame in a specified video format through video encoder. The specified video format refers to a format with high compressibility and high image quality, such as moving picture experts group-4 part 10 (H264), high-efficiency video coding (H256), video engine VP8/VP9, video codec standard AV1, or the like.

3): The first terminal transmits the encoded image information to the second terminal through the first network transmitter.

The first terminal transmits the encoded image information to the second terminal in a form of a data packet. Header information is set in the data packet, and the header information is used to indicate a type of the data packet. For example, when the type of the data packet is video, the data packet is a video data packet.

Operation 205: The first terminal receives, through the first main program, a first operation command inputted through an input device of the first terminal, and transmits the first operation command to the stand-alone program through the first main program.

The first operation command is used to control the first operation object in the stand-alone program. The stand-alone program is configured to control the first operation object according to the first operation command. The first operation object is an object in the stand-alone program that is controlled by the first terminal. For example, a virtual object is configured in the stand-alone program. The virtual object is controlled by the first terminal, and the virtual object is the first operation object.

In an embodiment, the input device of the first terminal includes, for example but not limited to, at least one of a keyboard, a mouse, an operating handle, and a touch screen.

Operation 206: The second terminal receives, through the second main program, the image information of the stand-alone program that is transmitted by the first terminal through the network connection.

The second main program includes a second network receiver. The second terminal receives, through the second network receiver, the image information transmitted by the first terminal through the network connection.

Operation 207: The second terminal displays the image information through the second main program.

The second main program includes a video decoder. The second terminal displays the image information through the second main program by using, for example but not limited to, the following operations:

1): The second terminal decodes the image information through the video decoder to obtain decoded image information.

The image information is transmitted in the form of a data packet. The second terminal recognizes a type of the data packet according to header information of the data packet, and obtains a video data packet through recognition.

The second terminal removes the header information of the video data packet, distributes the video data packet with the header information removed to the video decoder, and decodes the video data packet through the video decoder to obtain decoded image information.

2): The second terminal displays the decoded image information on a user interface of the second main program.

Operation 208: The second terminal receives, through the second main program, a second operation command inputted through an input device of the second terminal, and transmits the second operation command to the first terminal through the second main program.

The second operation command is used to control the second operation object in the stand-alone program. The stand-alone program is further configured to control the second operation object according to the second operation command. The second operation object and the first operation object are different operation objects. For example, the stand-alone game further includes another virtual object. The another virtual object is controlled by the second terminal, and the another virtual object is the second operation object. In addition, the above virtual object, which is controlled by the first terminal and is the first operation object, and the another virtual object, which is controlled by the second terminal and is the second operation object, may be, for example, two virtual characters, two virtual animals, or two pieces of Tetris in the stand-alone game.

In an embodiment, the input device of the second terminal includes, for example but not limited to, at least one of a keyboard, a mouse, an operating handle, and a touch screen.

In an embodiment, when the stand-alone program is run on a Windows platform, the second operation command may be obtained in at least one of the following manners:

a. obtaining the second operation command through Windows message interception;

b: hooking a GetRawInput API to capture the second operation command; and c. capturing the operation command from a driver layer.

In an embodiment, the second main program includes a second operation command translator and a second network transmitter. The second terminal transmits the second operation command to the first terminal through the second main program by using, for example but not limited to, the following operations:

1): The second terminal serializes the second operation command through the second operation command translator to obtain a serialized second operation command.

The second terminal serializes the obtained second operation command into data in a specified information description format through the second operation command translator to generate the serialized second operation command.

For example, the second operation command translator classifies and translates operation commands from different input devices into corresponding expression information. For example, for an operation command inputted through a mouse, corresponding expression information records information about a position where a button of the mouse is pressed or raised, information about a position of a cursor of the mouse in a game screen when the action occurs, a scroll change amount of a wheel of the mouse, and the like.

In an embodiment, the specified information description format may include JavaScript object notation (JSON), extensible markup language (XML), protocol buffer, or formats corresponding to other public/private protocols.

The second terminal further adds header information to a data packet of the serialized second operation command. The header information is used to mark a type of the data packet as the second operation command.

2): The second terminal transmits the serialized second operation command to the first terminal through the second network transmitter.

Operation 209: The first terminal receives, through the first main program, the second operation command transmitted by the second terminal through the network connection, and transmits the second operation command to the stand-alone program through the first main program.

In an embodiment, the first main program includes a first operation command translator and a stand-alone program controller. After receiving, through the first main program, the first terminal receives the second operation command transmitted by the second terminal through the network connection, the first terminal deserializes the serialized second operation command through the first operation command translator to obtain a deserialized second operation command.

The second operation command is transmitted in the form of a data packet. The first terminal recognizes the data packet of the second operation command according to the header information of the data packet, and removes the header information of the data packet. The first terminal deserializes the second operation command to obtain the deserialized second operation command.

In an embodiment, the first terminal distributes the data packet of the second operation command with the header information removed to the first operation command translator, and translates the data packet with the header information removed and deserializes the second operation command through the first operation command translator to obtain the deserialized second operation command. The deserialized second operation command may be recognized and executed by the first terminal.

In an embodiment, when the format of the deserialized second operation command is a first format, the first terminal converts the first format of the second operation command to a second format. The first terminal cannot execute the second operation command in the first format, but may execute the second operation command in the second format.

The deserialized second operation command is transmitted to the stand-alone program through the stand-alone program controller.

In an embodiment, the second terminal transmits, through the stand-alone program controller, the second operation command recognizable by the stand-alone program to the stand-alone program, and the stand-alone program controller may transmit the second operation command by:

transmitting the second operation command through a virtual drive control; or invoking an application programming interface (API) in a system to transmit the second operation command; or simulating the operation command into a corresponding operation command in the first terminal and transmitting a simulated second operation command.

In an embodiment, the API in the system may include functions such as SendInput, XInput, DirectInput, and the like.

For example, the first terminal transmits the operation command through the stand-alone program controller. First, the stand-alone program controller determines an instruction type of the second operation command. The instruction type includes a mouse type, a keyboard type, and an operating handle type.

Then the stand-alone program controller invokes a corresponding API function to transmit the second operation command according to the instruction type, or simulates the second operation command according to the instruction type and transmits the simulated second operation command, or transmits second operation commands of different instruction types through the virtual drive control.

Based on the above, according to the method for running a stand-alone program provided in this embodiment, the stand-alone program is run in the first main program, a network connection is established between the first terminal and the second terminal through the first main program that is run in the first terminal and the second main program that is run in the second terminal, and the image information is transmitted by the first terminal to the second terminal and the second operation command is transmitted by the second terminal to the first terminal, through the network connection. The stand-alone program is a program capable of controlling a first operation object and a second operation object separately. The stand-alone program is configured to control the first operation object according to the first operation command and control the second operation object according to the second operation command. According to the method, the first terminal and the second terminal achieve separate control of the first operation object and the second operation object in the stand-alone program through the network connection to the second terminal that is established through the first main program, allowing users in different regions to control operation of the stand-alone program in a multi-player operation mode by using different terminals. Thus, the problem in the related art that the multi-player mode of the stand-alone program (e.g., stand-alone game) is controlled through only one electronic device and cannot be controlled through two or more electronic devices simultaneously is solved. Therefore, an application of the multi-player mode of the stand-alone program is expanded and user experience is enhanced.

Figure 3:
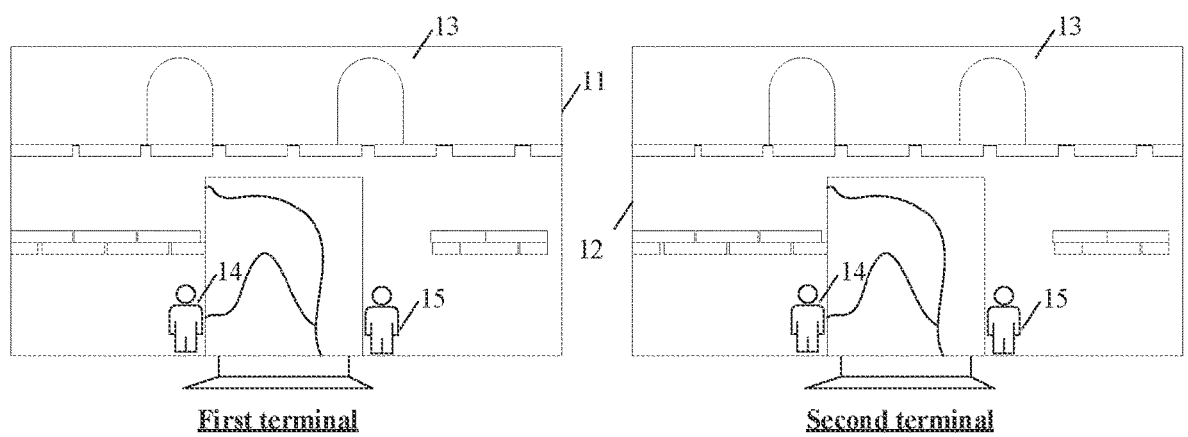
FIG. 3 is a schematic diagram of an interface of a terminal during connecting according to an example embodiment of the disclosure.

For example, the stand-alone program is a stand-alone game. As shown in FIG. 3, after the stand-alone game is activated, pictures of a display interface 11 on the first terminal and a display interface 12 on the second terminal are synchronous. The first terminal and the second terminal both display a game interface 13 in the display interface 11 and the display interface 12. A virtual object 14 in the game interface 13 is controlled by a first user through the first terminal, and a virtual object 15 is controlled by a second user through the second terminal. A process of the multi-player game of the first terminal and the second terminal is shown in FIG. 2 and is not described in detail herein again.

Operation 201, operation 202, operation 204, operation 205, and operation 209 may be implemented as an independent embodiment to implement the method for running a stand-alone program in the first terminal. Operation 203, operation 206, operation 207, and operation 208 may be implemented as an independent embodiment to implement the method for running a stand-alone program in the second terminal. In addition, operation 205 may be performed at any time point between operation 206 and operation 206, which is not limited in this embodiment.

Figure 4:
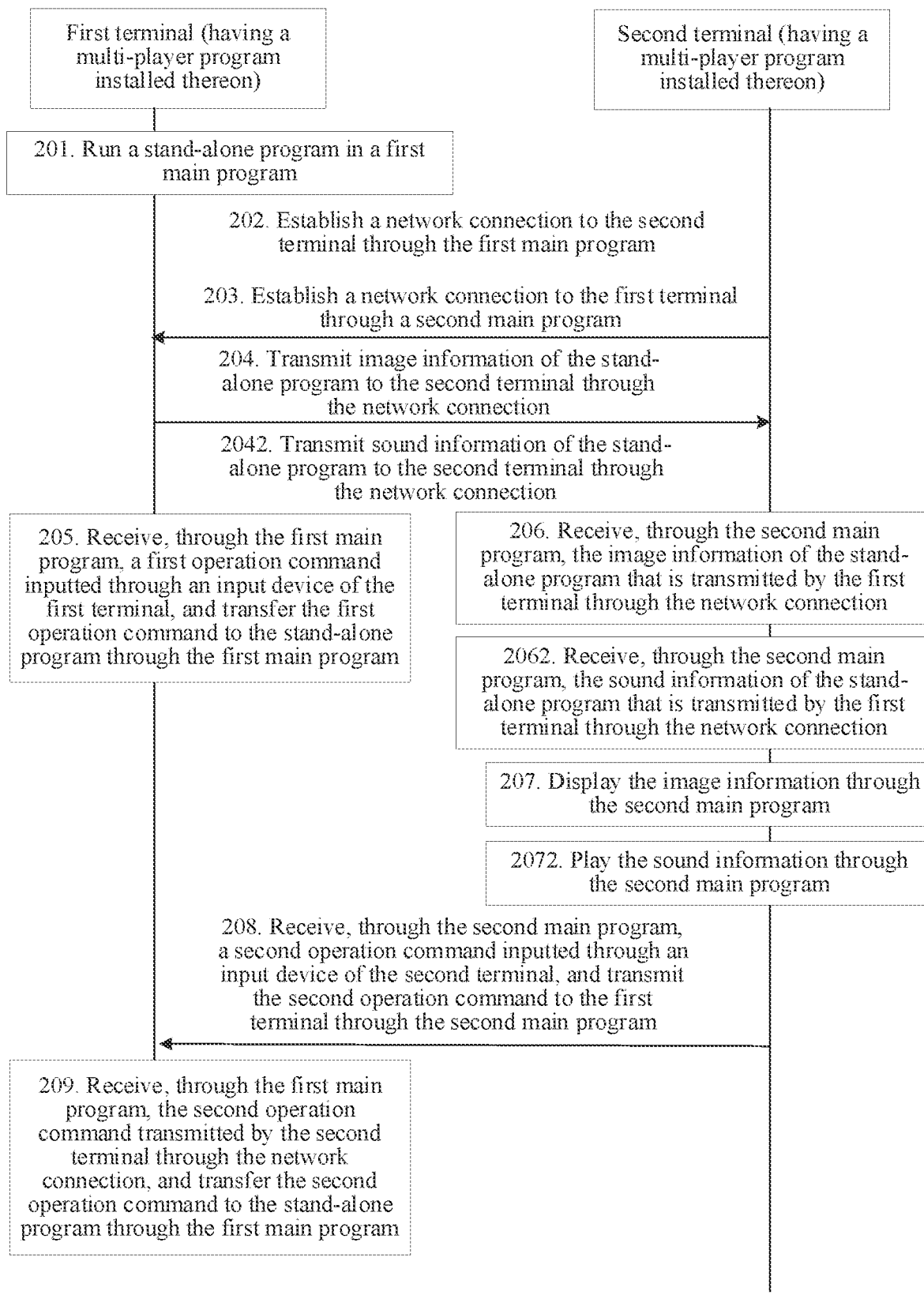
FIG. 4 is a flowchart of a method for running a stand-alone program according to another example embodiment of the disclosure.

Based on FIG. 2, the first terminal further shares sound information with the second terminal. The sound information may be transmitted before or after transmission of the image information. In an example embodiment, as shown in FIG. 4, the sound information is transmitted after transmission of the image information. The method in FIG. 4 includes operations as follows:

Operation 201: Run the stand-alone program in the first main program.

Operation 202: The first terminal establishes a network connection to the second terminal through the first main program.

Operation 203: The second terminal establishes a network connection to the first terminal through the second main program.

Operation 204: The first terminal transmits image information of the stand-alone program to the second terminal through the network connection.

Operation 2042: The first terminal transmits sound information of the stand-alone program to the second terminal through the network connection.

In an embodiment, the first main program further includes an audio encoder. After the establishing a network connection to the second terminal through the first main program, the method may further include the following operations:

1): The first terminal obtains current sound information in the first terminal.

In an embodiment, the current sound information includes a sound of the stand-alone program or a global sound of the system. For example, when the stand-alone program is run in the first terminal while music is played at the same time, the global sound includes the sound of the stand-alone program and a sound of the music (which is not background music of the stand-alone program).

The first terminal obtains the current sound information. In an embodiment, the first terminal captures a sound by using an audio capture API provided by the operating system, for example, by using, in a Windows environment, an audio capture API provided by the Windows operating system. The audio capture API includes core audio APIs.

Alternatively, the first terminal captures a sound by hooking the operating system or other audio playback APIs.

2): The first terminal encodes the sound information through an audio encoder to obtain encoded sound information.

The first terminal encodes the obtained sound information into an audio in a specified audio format through the audio encoder. The specified audio format refers to a format with high compressibility and high sound quality, such as an audio coding format OPUS, audio coding 3 (AC3), or the like.

3): The first terminal transmits the encoded sound information to the second terminal through the first network transmitter.

Operation 205: The first terminal receives, through the first main program, a first operation command inputted through an input device of the first terminal, and transmits the first operation command to the stand-alone program through the first main program.

Operation 206: The second terminal receives, through the second main program, the image information of the stand-alone program that is transmitted by the first terminal through the network connection.

Operation 2062: The second terminal receives, through the second main program, the sound information of the stand-alone program that is transmitted by the first terminal through the network connection.

In an embodiment, the second terminal receives, through the second network receiver, the sound information transmitted by the first terminal through.

Operation 207: The second terminal displays the image information through the second main program.

Operation 2072: The second terminal plays the sound information through the second main program.

The second main program further includes an audio decoder. The sound information is transmitted in a form of a data packet. The second terminal recognizes a type of the data packet according to header information of the data packet, and obtains an audio data packet through recognition. The second terminal removes the header information of the audio data packet, distributes the audio data packet with the header information removed to the audio decoder, and decodes the audio data packet through the audio decoder to obtain decoded sound information.

In an embodiment, the second terminal transmits the audio data packet to the audio decoder for decoding by using the following operations:

1): The second terminal decodes the sound information through an audio decoder to obtain decoded sound information.

2): The second terminal plays the decoded sound information through a player.

The second terminal further needs to correspondingly mark the decoded image information and sound information with a time stamp for synchronization.

Operation 208: The second terminal receives, through the second main program, a second operation command inputted through an input device of the second terminal, and transmits the second operation command to the first terminal through the second main program.

Operation 209: The first terminal receives, through the first main program, the second operation command transmitted by the second terminal through the network connection, and transmits the second operation command to the stand-alone program through the first main program.

Based on the above, according to the method for running a stand-alone program provided in this embodiment, the stand-alone program is run in the first main program, a network connection is established between the first terminal and the second terminal through the first main program that is run in the first terminal and the second main program that is run in the second terminal, and the image information is transmitted by the first terminal to the second terminal and the second operation command is transmitted by the second terminal to the first terminal, through the network connection. The stand-alone program is a program capable of controlling a first operation object and a second operation object separately. The stand-alone program is configured to control the first operation object according to the first operation command and control the second operation object according to the second operation command. According to the method, the first terminal and the second terminal achieve separate control of the first operation object and the second operation object in the stand-alone program through the network connection to the second terminal that is established through the first main program, allowing users in different regions to control operation of the stand-alone program in a multi-player operation mode by using different terminals. Thus, the problem in the related art that the multi-player mode of the stand-alone program (e.g., stand-alone game) is controlled through only one electronic device and cannot be controlled through two or more electronic devices simultaneously is solved. Therefore, an application of the multi-player mode of the stand-alone program is expanded and user experience is enhanced.

In addition, the stand-alone program is run in the first terminal, and the second terminal does not need to run the stand-alone program. Therefore, when the first terminal may smoothly run the stand-alone program, the second terminal may also smoothly control the stand-alone program, which reduces requirements for hardware configuration of the second terminal.

Figure 5:
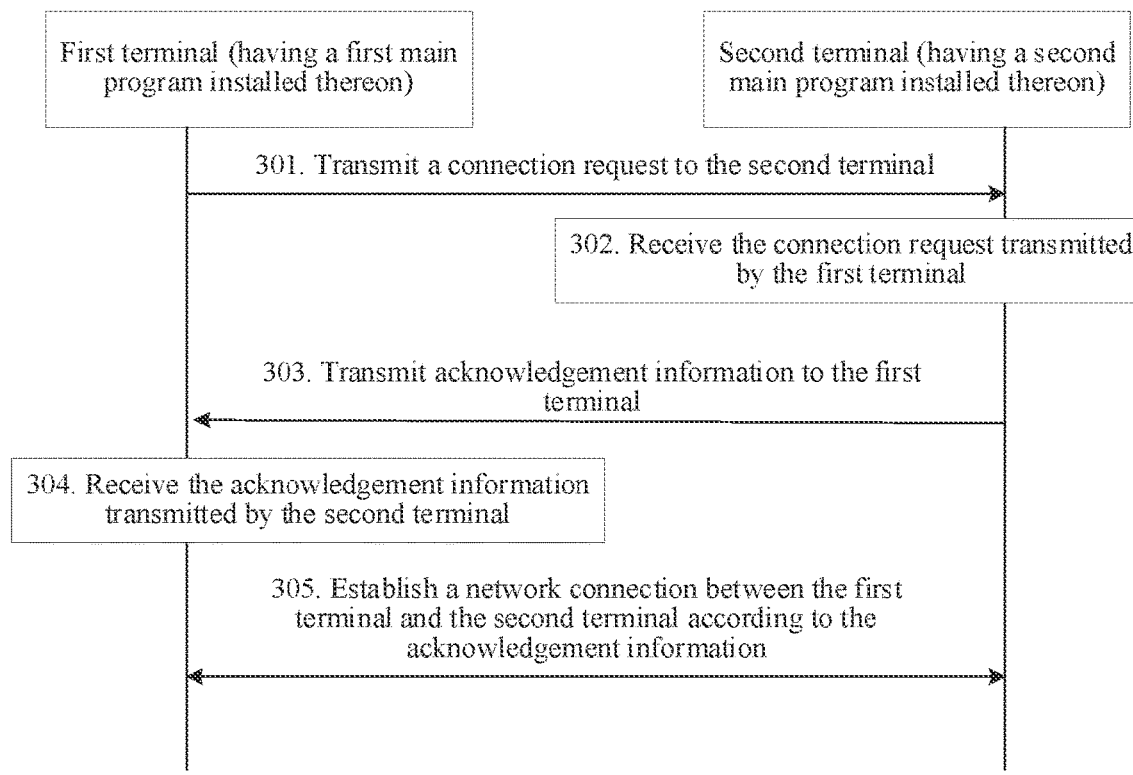
FIG. 5 is a flowchart of a method for running a stand-alone program according to another example embodiment of the disclosure.

Based on FIG. 2, to connect the first terminal and the second terminal, a network connection needs to be established first. As shown in FIG. 5, the first terminal establishes a network connection to the second terminal by using the following operations:

Operation 301: The first terminal transmits a connection request to the second terminal.

The stand-alone program is run on the first terminal through the first main program. For example, the first terminal may transmit the connection request to the second terminal by using the following operations:

1): Display a first user interface of the first main program on the display interface of the first terminal, the first user interface including a connection control.

Figure 6:
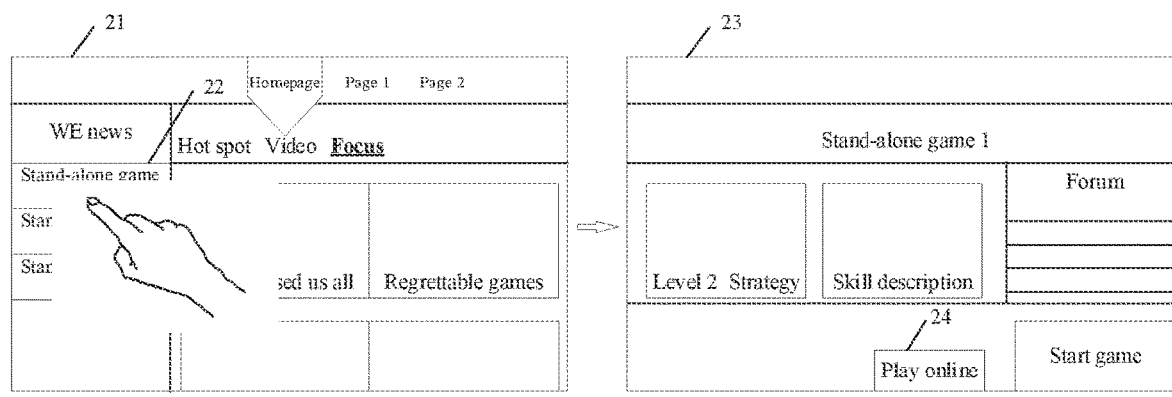
FIG. 6 is a schematic diagram of an interface of a terminal during connecting of a stand-alone program according to an example embodiment of the disclosure.

For example, the stand-alone program is a stand-alone game. In a left figure of FIG. 6, a main interface 21 of the first main program is displayed. The main interface 21 includes selection controls respectively corresponding to games such as a stand-alone game 1, a stand-alone game 2, and a stand-alone game 3. The stand-alone game 1 corresponds to a selection control 22 (that is, the selection control 22 is performed on the stand-alone game 1). By triggering the selection control 22 through the input device of the first terminal, a first user interface 23 of the first main program is displayed on the first terminal. As shown in the right figure in FIG. 6, the first user interface 23 includes a connection control 24.

2): The first terminal receives a trigger operation on the connection control.

3): Display a multi-player interface of the stand-alone game on the display interface of the first terminal, the multi-player interface including a request control.

Figure 7:
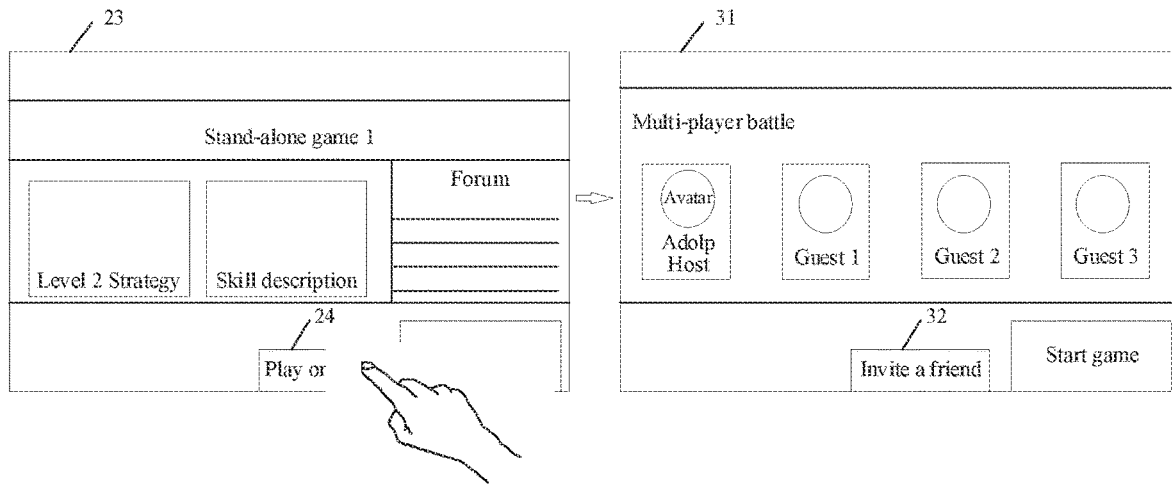
FIG. 7 is a schematic diagram of an interface of a terminal during connecting of a stand-alone program according to another example embodiment of the disclosure.

For example, as shown in FIG. 7, after the first terminal receives the trigger operation on the connection control 24, a multi-player interface 31 of the first main program is displayed on the display interface of the first terminal. The multi-player interface 31 includes a selection control 32.

4): The first terminal receives a trigger operation on a selection control.

The selection control is configured to select a connection object. The object is a second user who is a social friend with the first user.

5): Display a friend list on the display interface of the first terminal.

The first terminal is logged in to with a first account, and there are n social friends corresponding to the first account. After the first terminal receives the trigger operation on the selection control, the friend list is displayed on the first terminal.

Figure 8:
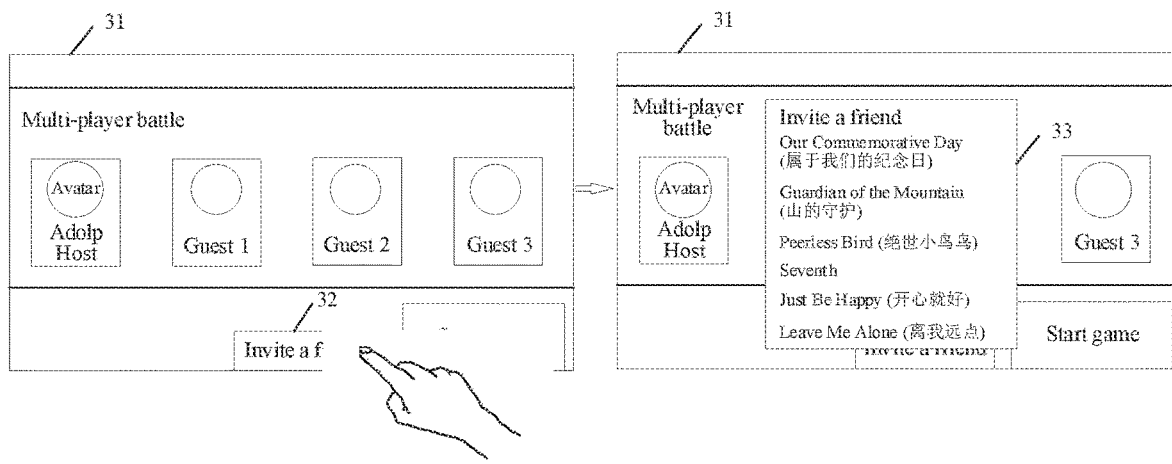
FIG. 8 is a schematic diagram of an interface of a terminal during connecting of a stand-alone program according to another example embodiment of the disclosure.

For example, as shown in FIG. 8, the first terminal receives the trigger operation on the selection control 32 and superimposes the friend list 33 on the multi-player interface 31.

6): The first terminal receives a selection operation on the friend list.

7): Display the request control on a corresponding selection item in the friend list.

The trigger operation on the request control is configured to trigger the first terminal to transmit the connection request to the second terminal.

Figure 9:
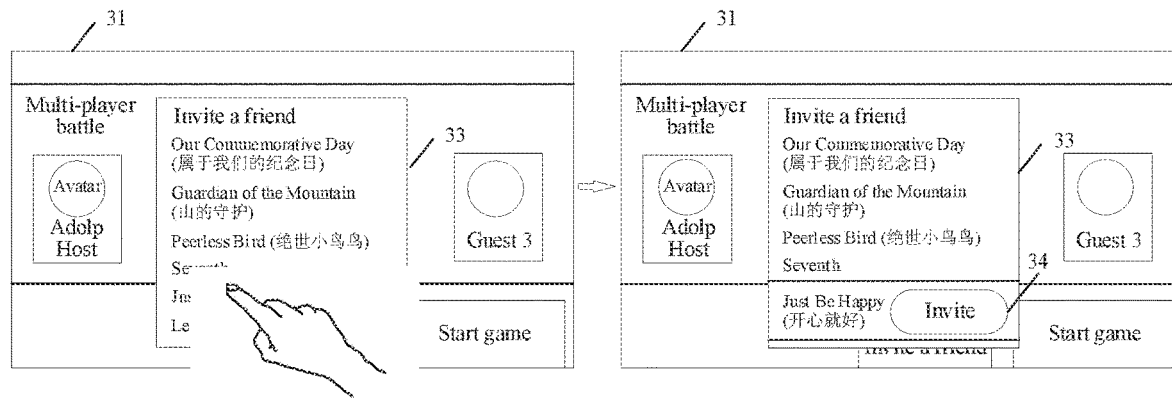
FIG. 9 is a schematic diagram of an interface of a terminal during connecting of a stand-alone program according to another example embodiment of the disclosure.

For example, as shown in FIG. 9, a selection operation is triggered on a selection item in a friend list 33, and therefore a request control 34 is displayed on a right side of the selection item.

8): The first terminal receives a trigger operation on the request control.

9): The first terminal generates a connection request according to the trigger operation on the request control. The connection request includes a second account with which the second terminal is logged in to.

The connection request is used to request to establish a network connection to the second terminal logged in to with the second account.

Operation 302: The second terminal receives the connection request transmitted by the first terminal.

Operation 303: The second terminal transmits acknowledgement information to the first terminal.

A second main program is run in the second terminal. When the second terminal receives the connection request transmitted by the first terminal through the second main program, an acknowledgement interface is displayed on the display interface of the second main program. The acknowledgement interface includes an acknowledgement control, and the acknowledgement control is configured to acknowledge establishment of the network connection between the second terminal and the first terminal.

In an embodiment, the acknowledgement interface further includes a rejection control. The rejection control is configured to reject establishment of the network connection to the first terminal.

Figure 10:
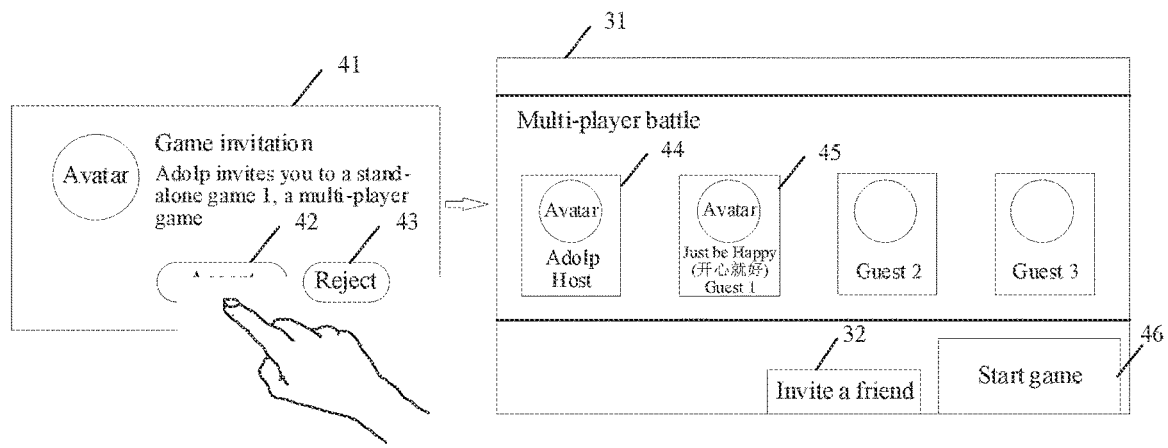
FIG. 10 is a schematic diagram of an interface of a terminal during connecting of a stand-alone program according to another example embodiment of the disclosure.

For example, as shown in FIG. 10, an acknowledgement interface 41 is displayed on the display interface of the second terminal. The acknowledgement interface 41 includes an acknowledgement control 42 and a rejection control 43.

The second terminal receives a trigger operation on the acknowledgement control, generates acknowledgement information according to the trigger operation on the acknowledgement control, and transmits the acknowledgement information to the first terminal. The acknowledgement information is used to acknowledge that the second terminal accepts the connection request of the first terminal.

In an embodiment, the second terminal receives a trigger operation on the rejection control, generates rejection information according to the trigger operation on the rejection control, and transmits the rejection information to the first terminal. The rejection information is used for the second terminal to reject the connection request of the first terminal.

Operation 304: The first terminal receives the acknowledgement information transmitted by the second terminal.

Operation 305: The first terminal establishes the network connection to the second terminal according to the acknowledgement information.

In an embodiment, the network connection includes a direct peer-to-peer connection or a connection through a relay server.

For example, the first account includes an avatar and a name of the first account. The second account includes an avatar and a name of the second account. After the establishment of the network connection between the first terminal and the second terminal is acknowledged, a multi-player interface of the first main program is displayed in the first terminal. The multi-player interface of the first main program includes the avatar and the name of the first account and the avatar and the name of the second account. A multi-player interface of the second main program is further displayed in the second terminal. The multi-player interface of the second main program includes the avatar and the name of the first account and the avatar and the name of the second account.

For example, as shown in FIG. 10, after receiving the trigger operation on the acknowledgement control 42, the second terminal displays the multi-player interface 31. The multi-player interface 31 includes an avatar and a name corresponding to account information of a first user that is displayed in a form of a card 44 and an avatar and a name corresponding to account information of a second user that is displayed in a form of a card 45.

The multi-player interface 31 includes a start control 46. The start control 46 is configured to trigger start of a game. When a trigger operation is received on the start control 46, the game is started.

Figure 11:
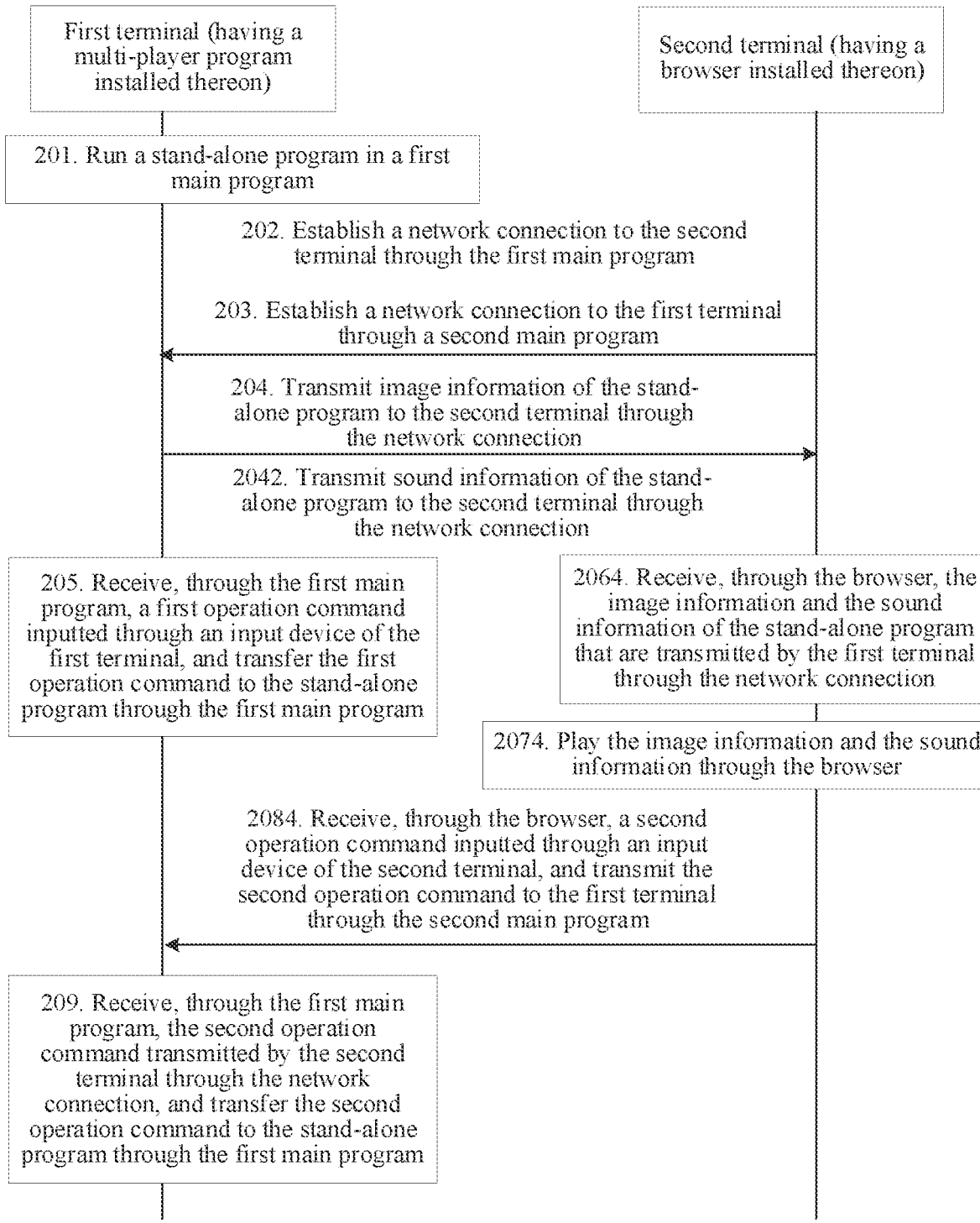
FIG. 11 is a flowchart of a method for running a stand-alone program according to another example embodiment of the disclosure.

Based on FIG. 4, when the second main program that is run in the second terminal is a browser, as shown in FIG. 11, operation 206 to operation 208 may be replaced with operation 2064 to operation 2084, which are as follows:

Operation 2064: The second terminal receives, through the browser, the image information and the sound information of the stand-alone program that are transmitted by the first terminal through the network connection.

JavaScript code in the second terminal receives, through a network protocol, the video data packet and the audio data packet that are transmitted by the first terminal. In an embodiment, the network protocol includes a Web Socket or HTTP protocol.

Operation 2074: The second terminal plays the image information and the sound information through the browser.

Playing the image information and the sound information by the second terminal includes the following operations:

1): The second terminal decodes the video packet and the audio packet to obtain decoded image information and sound information.

2): The second terminal plays the image information and the sound information through corresponding controls. For example, the image information is played through HTML5 video and the sound information is played through HTML5 audio, or the image information and the sound information are plated through flash.

Operation 2084: The second terminal receives, through the browser, a second operation command inputted through an input device of the second terminal, and transmits the second operation command to the first terminal.

The transmission process of the second operation command in the second terminal is as follows:

1) The js code on a page of the browser in the second terminal captures the second operation command.

2) The second terminal serializes the second operation command through the js code to generate a serialized second operation command.

In an embodiment, the js code serializes the operation command in a manner of serialization by the second operation command translator to form a second operation command in the form of a data packet.

3) The second terminal transmits the serialized second operation command to the first terminal through the network protocol.

In some embodiments, the first terminal and the second terminal may implement real-time communication between the first terminal and the second terminal through a Web real-time communication (WebRTC) API. The WebRTC API is an API that supports a browser for real-time voice or video conversations.

Based on the above, according to the method for running a stand-alone program provided in this embodiment, the first terminal and the second terminal achieve separate control of the first operation object and the second operation object in the stand-alone program through the network connection to the first terminal running the first main program that is established by the second terminal through the browser, allowing users in different regions to control operation of the stand-alone program in a multi-player operation mode by using different terminals.

In addition, in the method, it is unnecessary to install, in the second terminal, an application program the same as the first main program, that is, it is unnecessary to install a multi-player program, and the second operation object in the stand-alone program may also be controlled to operate through the browser. The stand-alone program is run through the first main program in the first terminal.

Moreover, since the browser is connected to the first terminal, there is no restriction on a type of the second terminal. The second terminal may be any device with a browser installed, such as a computer, a mobile phone, a tablet computer, or the like with a browser installed, and it is unnecessary to install a second main program in a form of a third-party application program on the device.

Figure 12:
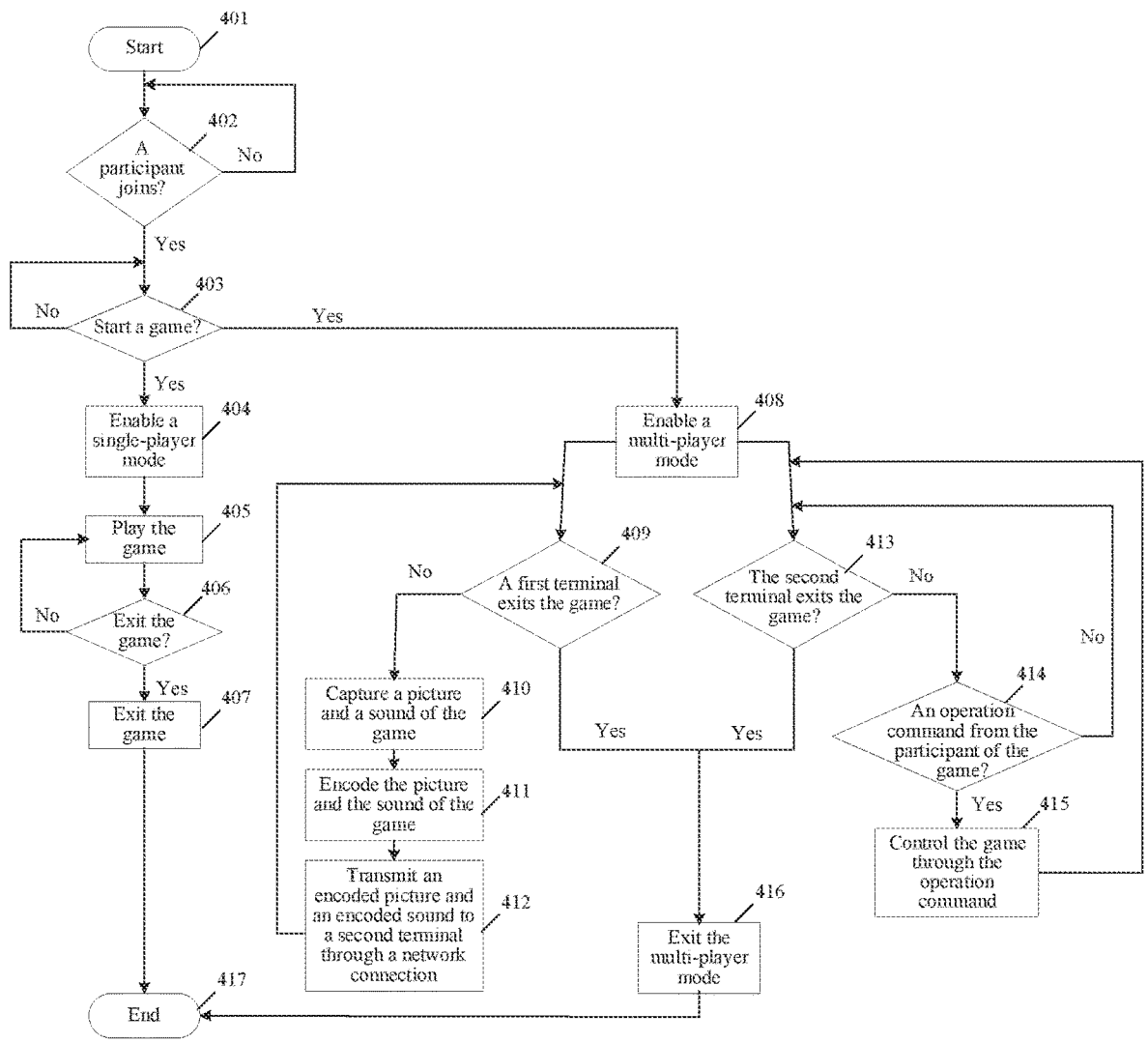
FIG. 12 is a flowchart of a method for running a stand-alone program according to another example embodiment of the disclosure.

For example, the stand-alone program is a stand-alone game. Processes of running the stand-alone game in the first terminal and the second terminal are respectively described. FIG. 12 is a flowchart of the process of running the stand-alone game in the first terminal. The first main program is run in the first terminal. Operations are as follows:

Operation 401: Start.

Operation 402: Determine whether a participant joins.

The first terminal determines whether a participant joins, that is, determines whether a second terminal joins and establishes a network connection to the first terminal, and performs operation 403 when a participant joins, or otherwise, waits for a participant to join, and performs operation 402 to continue to determine whether any participant joins.

Operation 403: Determine whether the game starts.

The first terminal determines whether the game starts, and performs operations 404 to 407 (single-player mode) or operation 408 to operation 416 (multi-player mode) when the game starts, or otherwise, waits for the game to start, and performs operation 403 to continue to determine whether the game starts.

Operation 404: Enable a single-player mode.

Operation 405: Play the game.

Operation 406: Determine whether to exit the game.

The first terminal determines whether to exit the game, and performs operation 407 when the first terminal receives an operation command to exit the game, or otherwise, performs operation 405 to continue the game.

Operation 407: Exit the game.

Operation 408: Enable a multi-player mode.

Operation 409: Determine whether the first terminal exits the game.

The first terminal determines whether the first terminal exits the game, and performs operation 416 when the first terminal determines that the first terminal exits the game, or otherwise, performs operation 410 to operation 412.

Operation 410: Capture a picture and a sound of the game.

The first terminal captures the picture and the sound of the game through the first main program.

Operation 411: Encode the picture and the sound of the game.

The first terminal encodes the picture and the sound of the game through the first main program.

Operation 412: Transmit the encoded game picture and sound to the second terminal through the network connection.

The first terminal transmits the encoded game picture and sound to the second terminal through the main program.

After transmitting the encoded picture and the encoded sound of the game to the second terminal through the network connection, the first terminal continues to perform operation 409.

Operation 413: Determine whether the second terminal exits the game.

The first terminal determines whether the second terminal exits the game, and performs operation 416 when the first terminal determines that the second terminal exits the game, or otherwise, performs operation 414 and operation 415.

Operation 414: Determine whether there is an operation command from the game participant.

The first terminal determines whether there is an operation command transmitted by the second terminal, and performs operation 415 when there is the operation command transmitted by the second terminal, or otherwise, performs operation 413.

Operation 415: Control the game through the operation command.

The first terminal deserializes the operation command through the first main program to obtain a deserialized operation command. The deserialized operation command is transmitted to the program of the stand-alone game through the first main program. The program controls the second operation object in the stand-alone game through the deserialized operation command. The second operation object is different from the first operation object. The first operation object is an operation object controlled by the first terminal. After controlling the game through the deserialized operation command, the first terminal continues to perform operation 413.

Operation 416: Exit the multi-player mode.

Operation 417: End.

Figure 13:
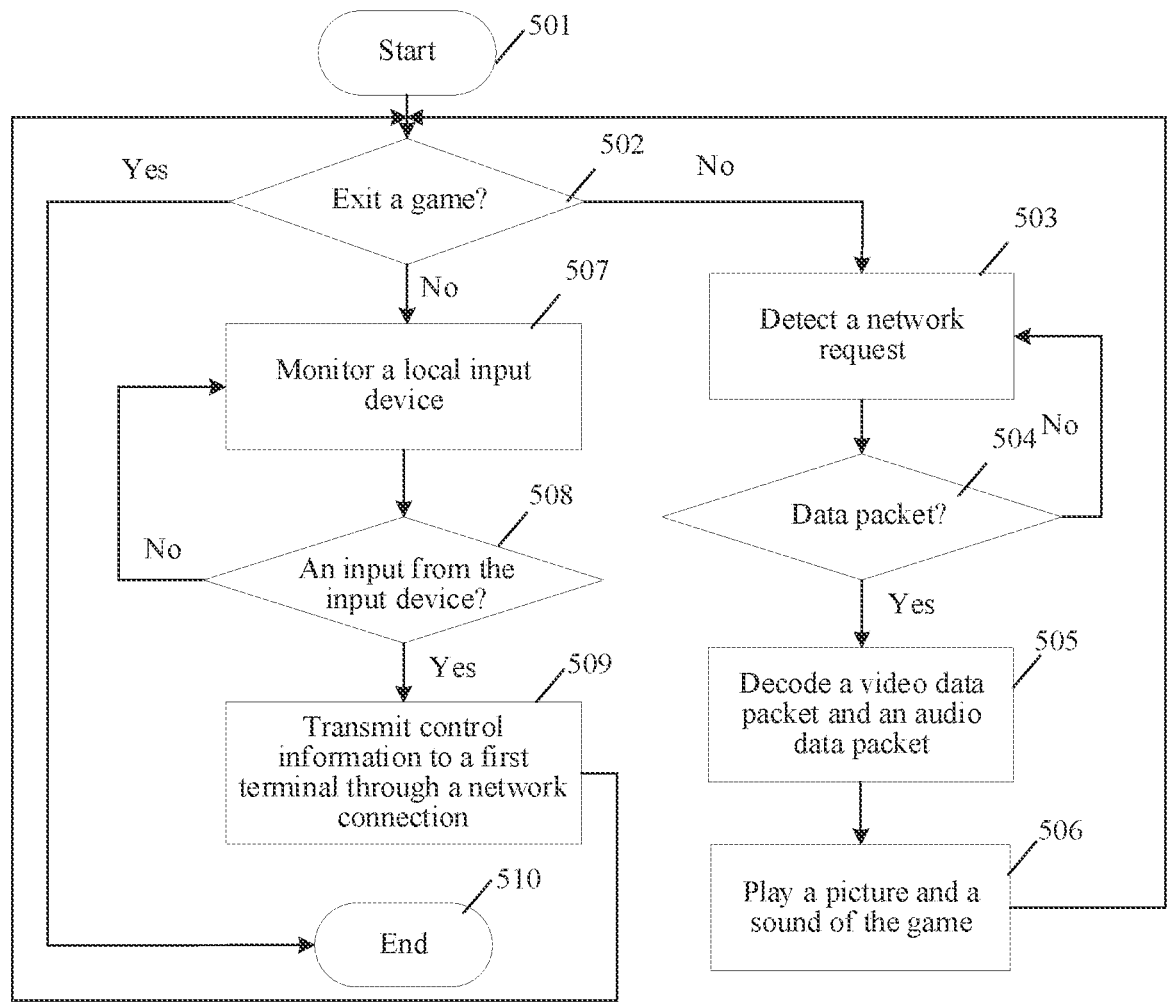
FIG. 13 is a flowchart of a method for running a stand-alone program according to another example embodiment of the disclosure.

FIG. 13 is a flowchart of a process of running the stand-alone game in the second terminal. The second main program is run in the second terminal. Operations are as follows:

Operation 501: Start.

Operation 502: Determine whether to exit a game.

The second terminal determines whether to exit the game, and performs operation 510 when the second terminal determines that the second terminal exits the game, or otherwise, performs operation 503 to operation 509.

Operation 503: Detect a network request.

Operation 504: Determine whether there is a data packet.

The second terminal detects whether there is a video data packet and an audio data packet transmitted by the first terminal on the network, and performs operation 505 to operation 506 when the second terminal receives the video data packet and the audio data packet, or otherwise, performs operation 503 to continue to detect the network request.

Operation 505: Decode the video data packet and the audio data packet.

The second terminal decodes the video data packet and the audio data packet through the second main program to obtain a picture and a sound of the game.

Operation 506: Play a picture and a sound of the game.

After the second terminal plays the picture and the sound of the game through the second main program, the second terminal performs operation 502.

Operation 507: Monitor a local input device.

In an embodiment, the local input device includes a mouse, a keyboard, an operating handle, a touch screen, or the like connected to the second terminal.

Operation 508: Determine whether there is input from the input device.

The second terminal determines whether the input device inputs an operation command, and performs operation 509 when the input device inputs an operation command, or otherwise, performs operation 507.

Operation 509: Transmit an operation command to the first terminal through the network connection.

The second terminal serializes, through the second main program, the operation command inputted through the input device to generate a serialized operation command, and transmits the serialized operation command to the first terminal through the network connection. After the second terminal transmits the serialized operation command to the first terminal through the network connection, the second terminal continues to perform operation 502.

Operation 510: End.

Figure 14:
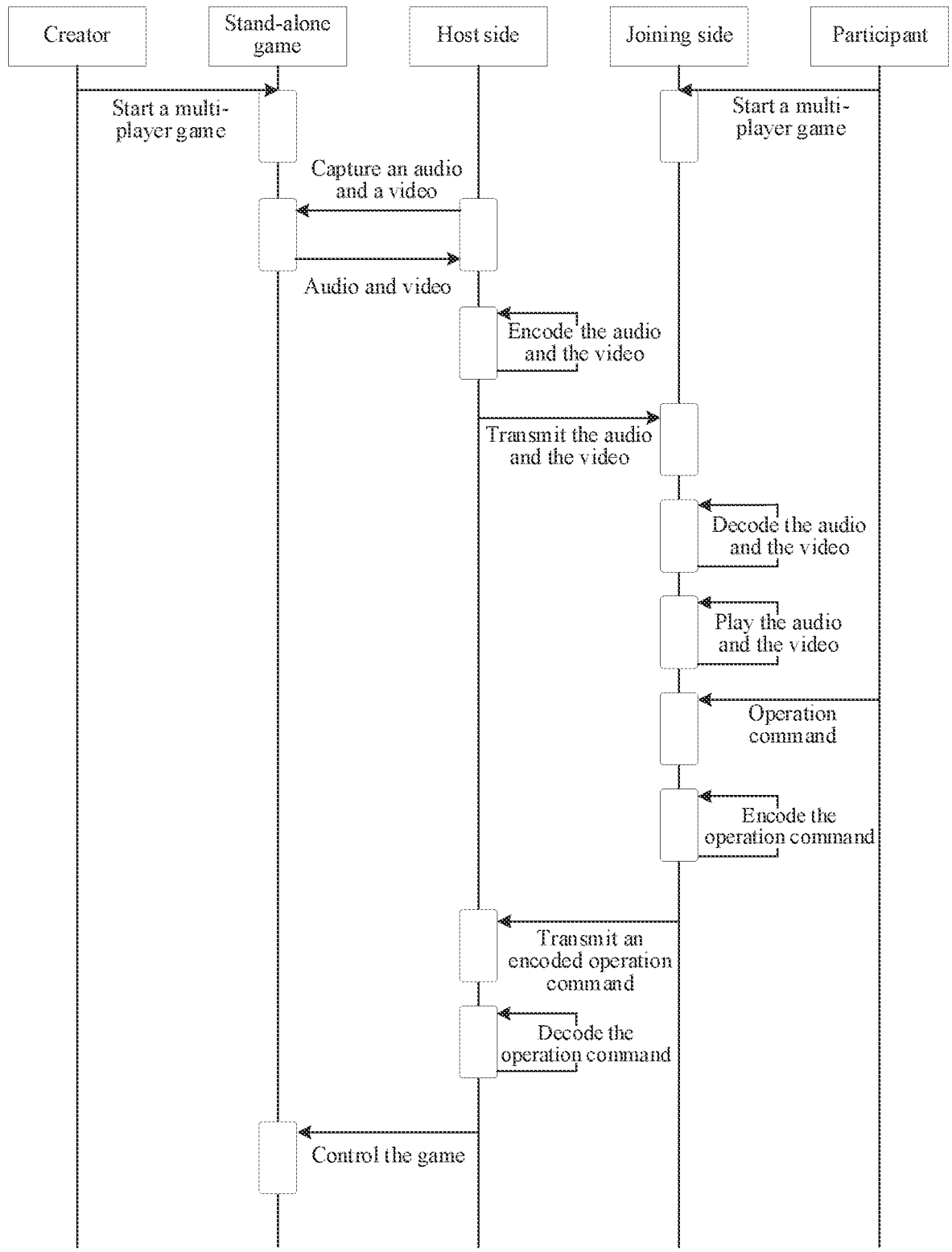
FIG. 14 is a timing diagram of a method for running a stand-alone program according to another example embodiment of the disclosure.

Based on the processes of the methods for running a stand-alone game shown in FIG. 12 and FIG. 13, timings of the operations in the processes are described. As shown in FIG. 14, a creator and a participant start a multi-player game. When the multi-player game is started on a host side (the first terminal) and a participant side (the second terminal), first, the host captures a video and an audio, encodes the video and the audio, and transmits the encoded video and audio to the participant side. Then the participant side decodes the video and the audio, and plays the video and the audio. Then the participant side detects an operation command triggered by a participant, encodes the operation command, and transmits the encoded operation command to the host side. Finally, the host side decodes the encoded operation command to obtain a restored operation command, and executes the restored operation command to control the game.

The first terminal and the second terminal implement the multi-player game of the stand-alone game by repeating the timing operations.

Based on the above, according to the method for running a stand-alone game provided in this embodiment, a network connection is established between the first terminal and the second terminal through the first main program that is run in the first terminal and the second main program that is run in the second terminal, and the first terminal continuously transmits the video and the audio of the first terminal to the second terminal through the first main program, and the second terminal continuously transmits the operation command of the second terminal to the first terminal through the second main program. The stand-alone game is a program capable of controlling a first operation object and a second operation object separately. In this way, the first terminal and the second terminal separately control the first operation object and the second operation object in the stand-alone game, allowing users in different regions to play the stand-alone game in the multi-player mode by using different terminals. Thus, the problem in the related art that the multi-player mode of the stand-alone program (e.g., stand-alone game) is controlled through only one electronic device and cannot be controlled through two or more electronic devices simultaneously is solved. Therefore, an application of the multi-player mode of the stand-alone program is expanded and user experience is enhanced.

Figure 15:
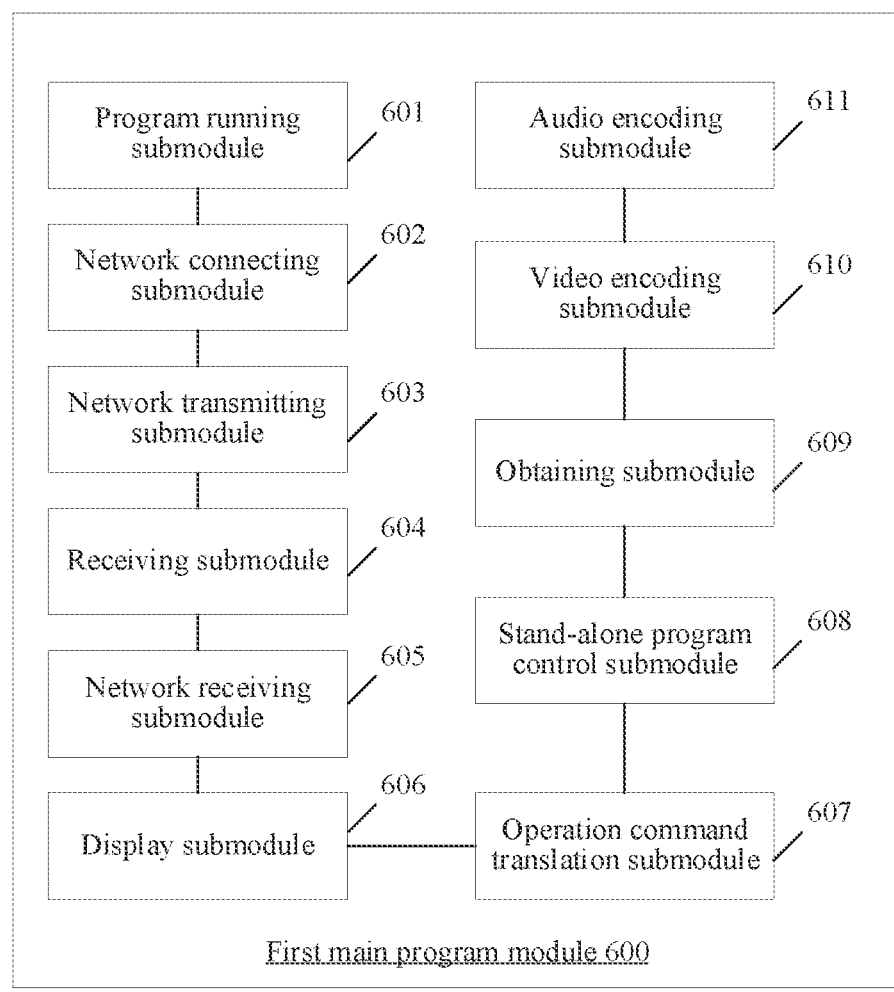
FIG. 15 is a block diagram of an apparatus for running a stand-alone program according to an example embodiment of the disclosure.

FIG. 15 shows an apparatus for running a stand-alone program according to an example embodiment of the disclosure. The apparatus is configured in a terminal. The apparatus may be implemented as a part or all of a first terminal through software, hardware or a combination thereof. The apparatus includes a first main program module 600.

The first main program module 600 includes:

a program running submodule 601 configured to run the stand-alone program in a first main program, the stand-alone program being a program capable of controlling a first operation object and a second operation object separately;

a network connecting submodule 602 configured to establish a network connection to a second terminal through the first main program;

a network transmitting submodule 603 configured to transmit image information of the stand-alone program to the second terminal through the network connection;

a receiving submodule 604 configured to receive, through the first main program, a first operation command inputted through an input device of the first terminal, and transmit the first operation command to the stand-alone program through the first main program; the stand-alone program being configured to control the first operation object according to the first operation command; and a network receiving submodule 605 configured to receive, through the first main program, a second operation command transmitted by the second terminal through the network connection, and transmit the second operation command to the stand-alone program through the first main program; the stand-alone program being further configured to control the second operation object according to the second operation command.

In some embodiments, the first main program is logged in to with a first account, the first account including a friend list.

The network connecting submodule 602 is configured to display the friend list in the first terminal, the friend list including at least one social friend (e.g., user who is registered as a social friend), which includes a social friend that corresponds to a second account; receive a selection operation on the friend list; determine a target second account according to the selection operation; and establish a network connection to the second terminal logged in to with the target second account.

In some embodiments, the network connecting submodule 602 is further configured to establish a direct peer-to-peer connection to the second terminal logged in to with the target second account, or establish, through a relay server, the network connection to the second terminal logged in to with the target second account.

In some embodiments, the first account further includes an avatar and a name of the first account. The second account further includes an avatar and a name of the second account.

The first main program module 600 further includes a display submodule 606.

The display submodule 606 is configured to display, in the first terminal, a multi-player interface of the first main program, the multi-player interface including the avatar and the name of the first account and the avatar and the name of the second account.

In an embodiment, the first main program module 600 includes an operation command translator submodule 607 and a stand-alone program controller submodule 608.

The operation command translator submodule 607 is configured to deserialize a serialized second operation command to obtain a deserialized second operation command.

The stand-alone program controller submodule 608 is configured to transmit the deserialized second operation command to the stand-alone program.

In some embodiments, the first main program module 600 includes an obtaining submodule 609, a video encoding submodule 610, and a network transmitting submodule 603.

The obtaining submodule 609 is configured to obtain image information in a display interface of the first terminal.

The video encoding submodule 610 is configured to encode the image information to obtain encoded image information.

The network transmitting submodule 603 is configured to transmit the encoded image information to the second terminal.

In some embodiments, the first main program module 600 further includes an audio encoding submodule 611.

The obtaining submodule 609 is configured to obtain sound information in the first terminal.

The audio encoding submodule 611 is configured to encode the sound information to obtain encoded sound information.

The network transmitting submodule 603 is configured to transmit the encoded sound information to the second terminal.

In some embodiments, the first main program module 600 includes a network receiving submodule 605.

The network receiving submodule 605 is configured to receive the second operation command transmitted by the second terminal through the network connection.

Based on the above, according to the apparatus for running a stand-alone program provided in this embodiment, the stand-alone program is run in the first main program, a network connection is established between the first terminal and the second terminal through the first main program that is run in the first terminal and the second main program that is run in the second terminal, and the image information is transmitted by the first terminal to the second terminal and the second operation command is transmitted by the second terminal to the first terminal, through the network connection. The stand-alone program is a program capable of controlling a first operation object and a second operation object separately. The stand-alone program is configured to control the first operation object according to the first operation command and control the second operation object according to the second operation command. According to the apparatus, the first terminal and the second terminal achieve separate control of the first operation object and the second operation object in the stand-alone program through the network connection to the second terminal that is established through the first main program, allowing users in different regions to control operation of the stand-alone program in a multi-player operation mode by using different terminals. Thus, the problem in the related art that the multi-player mode of the stand-alone program (e.g., stand-alone game) is controlled through only one electronic device and cannot be controlled through two or more electronic devices simultaneously is solved. Therefore, an application of the multi-player mode of the stand-alone program is expanded and user experience is enhanced.

Figure 16:
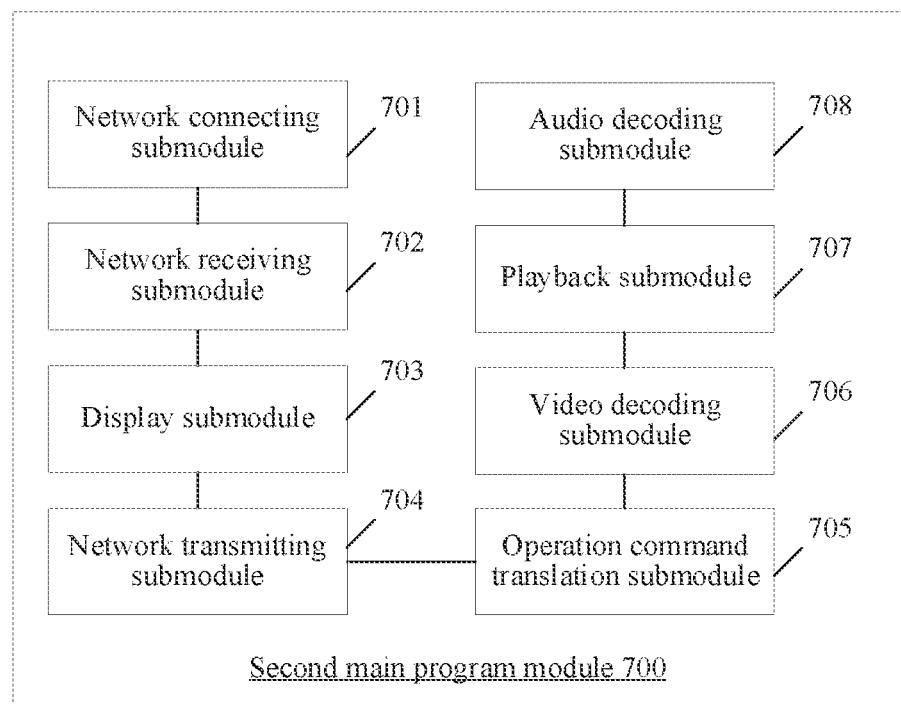
FIG. 16 is a block diagram of an apparatus for running a stand-alone program according to another example embodiment of the disclosure.

FIG. 16 shows an apparatus for running a stand-alone program according to an example embodiment of the disclosure. The apparatus is configured in a terminal. The apparatus may be implemented as a part or all of a second terminal through software, hardware or a combination thereof. The apparatus includes a second main program module 700.

The second main program module 700 includes:

a network connecting submodule 701 configured to establish a network connection to a first terminal through a second main program;

a network receiving submodule 702 configured to receive, through the second main program, image information of the stand-alone program that is transmitted by the first terminal through the network connection;

a display submodule 703 configured to display the image information through the second main program; and a network transmitting submodule 704 configured to receive, through the second main program, a second operation command inputted through an input device of the second terminal, and transmit the second operation command to the first terminal through the second main program; the second operation command being used by the stand-alone program to control a second operation object, and the stand-alone program being a program capable of controlling a first operation object and a second operation object separately.

In some embodiments, the first main program is logged in to with a first account. The second main program is logged in to with a second account. The second account includes a friend list, and the friend list includes a social friend corresponding to the first account.

The network connecting submodule 701 is further configured to establish a direct peer-to-peer connection to the first terminal logged in to with the first account, or establish, through a relay server, the network connection to the first terminal logged in to with the first account.

In some embodiments, the first account further includes an avatar and a name of the first account. The second account further includes an avatar and a name of the second account.

The display submodule 703 is configured to display, in the second terminal, a multi-player interface of the second main program, the multi-player interface including the avatar and the name of the first account and the avatar and the name of the second account.

In some embodiments, the second main program module 700 includes an operation command translation submodule 705 and a network transmitting submodule 704.

The operation command translator submodule 705 is configured to serialize the second operation command to obtain a serialized second operation command.

The network transmitting submodule 704 is configured to transmit the serialized second operation command to the first terminal.

In some embodiments, the second main program module 700 includes a network receiving submodule 702.

The network receiving submodule 702 is configured to receive image information transmitted by the first terminal through the network connection.

In some embodiments, the second main program module 700 includes a video decoding submodule 706 and a playback submodule 707.

The video decoding submodule 706 is configured to decode the image information to obtain decoded image information.

The display submodule 703 is configured to display the decoded image information on a user interface of the second main program.

In some embodiments, the second main program module 700 further includes an audio decoding submodule 708.

The network receiving submodule 702 is configured to receive sound information transmitted by the first terminal.

The audio decoding submodule 708 is configured to decode the sound information to obtain decoded sound information.

The playback submodule 707 is configured to play the decoded sound information.

Based on the above, according to the apparatus for running a stand-alone program provided in this embodiment, the stand-alone program is run in the first main program, a network connection is established between the first terminal and the second terminal through the first main program that is run in the first terminal and the second main program that is run in the second terminal, and the image information is transmitted by the first terminal to the second terminal and the second operation command is transmitted by the second terminal to the first terminal, through the network connection. The stand-alone program is a program capable of controlling a first operation object and a second operation object separately. The stand-alone program is configured to control the first operation object according to the first operation command and control the second operation object according to the second operation command. According to the apparatus, the first terminal and the second terminal achieve separate control of the first operation object and the second operation object in the stand-alone program through the network connection to the second terminal that is established through the first main program, allowing users in different regions to control operation of the stand-alone program in a multi-player operation mode by using different terminals. Thus, the problem in the related art that the multi-player mode of the stand-alone program (e.g., stand-alone game) is controlled through only one electronic device and cannot be controlled through two or more electronic devices simultaneously is solved. Therefore, an application of the multi-player mode of the stand-alone program is expanded and user experience is enhanced.

Figure 17:
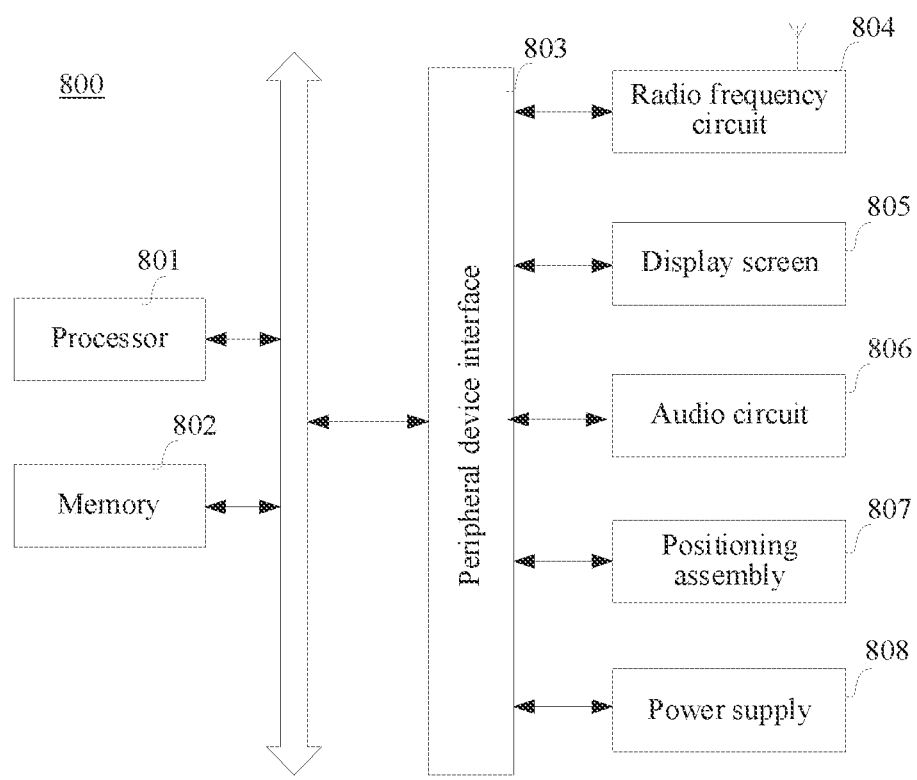
FIG. 17 is a schematic structural diagram of an electronic device according to an example embodiment of the disclosure.

FIG. 17 is a structural block diagram of a terminal 800 according to an example embodiment of the disclosure. The terminal 800 may be a smartphone, a tablet computer, a Moving Picture Experts Group Audio Layer III (MP3) player, a Moving Picture Experts Group Audio Layer IV (MP4) player, a notebook computer, or a desktop computer. The terminal 800 may also be referred to as another name such as user equipment, a portable terminal, a laptop terminal, or a desktop terminal.

Generally, the terminal 800 includes a processor 801 and a memory 802.

The processor 801 may include one or more processing cores, for example, a 4-core processor or a 5-core processor. The processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 801 may be integrated with a graphics processing unit (GPU). The GPU is configured to render and draw content that needs to be displayed on a display screen. In some embodiments, the processor 801 may further include an artificial intelligence (AI) processor. The AI processor is configured to process computing operations related to machine learning.

The memory 802 may include one or more computer-readable storage media. The computer-readable storage medium may be non-transient. The memory 802 may further include a high-speed random access memory and a nonvolatile memory, for example, one or more disk storage devices or flash storage devices. In some embodiments, the non-transitory computer-readable storage medium in the memory 802 is configured to store at least one instruction. The at least one instruction is used to be executed by the processor 801 to implement the method for running a stand-alone program provided in the method embodiments of the disclosure.

In some embodiments, the terminal 800 may optionally include a peripheral device interface 803 and at least one peripheral device. The processor 801, the memory 802, and the peripheral device interface 803 may be connected through a bus or a signal line. Each peripheral device may be connected to the peripheral device interface 803 through a bus, a signal line, or a circuit board. Specifically, the peripheral device includes at least one of a radio frequency (RF) circuit 804, a display screen 805, an audio circuit 806, a positioning assembly 807, and a power supply 808.

The peripheral interface 803 may be configured to connect the at least one peripheral related to input/output (I/O) to the processor 801 and the memory 802. In some embodiments, the processor 801, the memory 802 and the peripheral device interface 803 are integrated on a same chip or circuit board. In some other embodiments, any one or two of the processor 801, the memory 802, and the peripheral device interface 803 may be implemented on a single chip or circuit board. This is not limited in this embodiment.

The RF circuit 804 is configured to receive and transmit an RF signal, also referred to as an electromagnetic signal. The RF circuit 804 communicates with a communication network and other communication devices through the electromagnetic signal. The radio frequency circuit 804 converts an electrical signal to an electromagnetic signal for transmission, or converts a received electromagnetic signal to an electrical signal.

The display screen 805 is configured to display a user interface (UI). The UI may include a graph, text, an icon, a video, and any combination thereof. When the display screen 805 is a touch display screen, the display screen 805 further has a capability of collecting a touch signal on or above a surface of the display screen 805. The touch signal may be inputted to the processor 801 as a control signal for processing. In this case, the display screen 805 may be further configured to provide a virtual button and/or a virtual keyboard that are/is also referred to as a soft button and/or a soft keyboard. In some embodiments, there may be one display screen 805 disposed on a front panel of the terminal 800. In other embodiments, there may be at least two display screens 805 that are respectively disposed on different surfaces of the terminal 800 or folded. In some embodiments, the display screen 805 may be a flexible display screen disposed on a curved surface or a folded surface of the terminal 800. Even, the display screen 805 may be further set in a non-rectangular irregular pattern, namely, a special-shaped screen. The display screen 805 may be prepared by using materials such as a liquid crystal display (LCD), an organic light-emitting diode (OLED), or the like.

The audio circuit 806 may include a microphone and a speaker. The microphone is configured to collect sound waves of a user and an environment, and convert the sound waves into an electrical signal to input to the processor 801 for processing, or input to the radio frequency circuit 804 for implementing voice communication. For stereo collection or noise reduction, there may be a plurality of microphones that are respectively disposed at different portions of the terminal 800.

The positioning assembly 807 is configured to determine a current geographical position of the terminal 800, to implement navigation or a location based service (LBS). The positioning component 807 may be a positioning component based on the Global Positioning System (GPS) of the United States, the BeiDou system of China, the GLONASS System of Russia, or the GALILEO System of the European Union.

The power supply 808 is configured to supply power to components in the terminal 800. The power supply 808 may be an alternating current, a direct current, a disposable battery, or a rechargeable battery. When the power supply 808 includes the rechargeable battery, the rechargeable battery may support wired charging or wireless charging. The rechargeable battery may be further configured to support a fast charging technology.

A person skilled in the art would understand that the structure shown in FIG. 17 does not constitute a limitation on the terminal 800 and that the terminal may include more or fewer assemblies than those shown in the figure, a combination of some assemblies, or different assembly arrangements.

Figure 18:
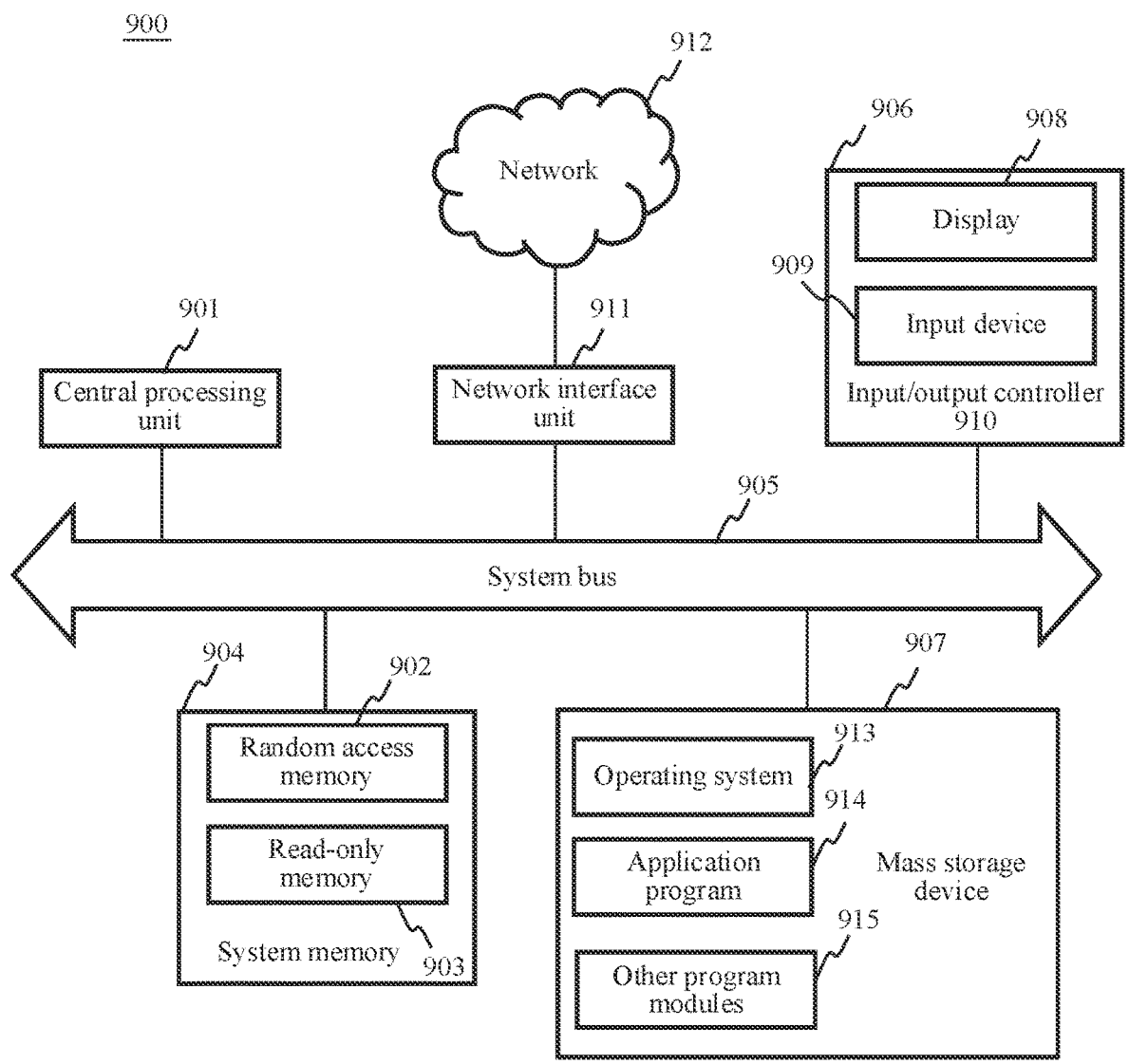
FIG. 18 is a schematic structural diagram of a server according to an example embodiment of the disclosure.

FIG. 18 is a schematic structural diagram of a server according to an embodiment of the disclosure. The server is configured to implement the method for running a stand-alone program provided in the above embodiments. Specifically, the server 900 includes a central processing unit (CPU) 901, a system memory 904 including a random access memory (RAM) 902 and a read-only memory (ROM) 903, and a system bus 905 connecting the system memory 904 to the central processing unit 901. The server 900 further includes a basic input/output system (I/O system) 906 for facilitating information transmission between various devices in a computer and a mass storage device 907 configured to store an operating system 913, an application program 914, and other program modules 915.

The basic input/output system 906 includes a display 908 configured to display information and an input device 909 such as a mouse and a keyboard for a user to input information. The display 908 and the input device 909 are both connected to the central processing unit 901 through an input/output controller 910 connected to the system bus 905. The basic input/output system 906 may further include the input/output controller 910 for receiving and processing input from a plurality of other devices such as a keyboard, a mouse, an electronic stylus, or the like. Similarly, the input/output controller 910 further provides output to a display screen, a printer, or other types of output devices.

The mass storage device 907 is connected to the central processing unit 901 through a mass storage controller (not shown) connected to the system bus 905. The mass storage device 907 and an associated computer readable medium thereof provide non-volatile storage for the server 900. In other words, the mass storage device 907 may include a computer-readable medium (not shown) such as a hard disk or a CD-ROM drive.

Without loss of generality, the computer-readable media may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 904 and the mass storage device 907 may be collectively referred to as a memory.

According to various embodiments of the disclosure, the server 900 may be further connected to a remote computer on a network to run through a network such as the Internet. In other words, the server 900 may be connected to a network 912 through a network interface unit 911 connected to the system bus 905, or may be connected to other types of networks or remote computer systems (not shown) through the network interface unit 911.

The sequence numbers of the foregoing embodiments of the disclosure are merely for description purpose but do not imply the preference among the embodiments.

A person of ordinary skill in the art would understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure, and are not intended to limit the disclosure. Any modification, equivalent replacement, improvement and the like made within the spirit and principle of the disclosure shall fall within the protection scope of the disclosure.

What is claimed is:

1. A method for running a stand-alone program, performed by a first terminal running a first main program, the method comprising:
running the stand-alone program in the first main program;
establishing a network connection to a second terminal through the first main program, the stand-alone program being a multi-player program, in which a first operation object and a second operation object are separately controlled by a first operation command and a second operation command, respectively, the second operation object being different from the first operation object;

transmitting image information of the stand-alone program to the second terminal through the network connection;

receiving, through the first main program, the first operation command inputted through an input device of the first terminal, and transmitting the first operation command to the stand-alone program through the first main program; and receiving, through the first main program, the second operation command, with respect to the multi-player program currently running on the first terminal, from the second terminal through the network connection, and transmitting the second operation command to the stand-alone program through the first main program, the stand-alone program being configured to control the second operation object in the stand-alone program according to the second operation command while simultaneously controlling the first operation object in the stand-alone program according to the first operation command.

2. The method according to claim 1, wherein the first main program is logged in to with a first account, the first account having a corresponding friend list;

the establishing the network connection comprises:
displaying the friend list in the first terminal;
receiving a selection operation on the friend list;
determining a second account corresponding to a selected friend; and
establishing the network connection between the first terminal and the second terminal logged in to a second main program with the second account.

3. The method according to claim 1, wherein the establishing the network connection comprises one of the following operations:
establishing a direct peer-to-peer connection between the first terminal and the second terminal; and
establishing, through a relay server, the network connection between the first terminal and the second terminal.

4. The method according to claim 2, further comprising, after the establishing the network connection to the second terminal logged in to the second main program with the second account:
displaying, in the first terminal, a multi-player interface of the first main program, the multi-player interface comprising an avatar and a name of the first account and an avatar and a name of the second account.

5. The method according to claim 1, wherein the first main program comprises a first operation command translator and a stand-alone program controller; and
the transmitting the second operation command comprises:
deserializing a serialized second operation command through the first operation command translator to obtain a deserialized second operation command; and
transmitting the deserialized second operation command to the stand-alone program through the stand-alone program controller.

6. The method according to claim 1, wherein the first main program comprises a video encoder and a first network transmitter; and the transmitting the image information comprises:
obtaining the image information in a display interface of the first terminal;
encoding the image information through the video encoder to obtain encoded image information; and
transmitting the encoded image information to the second terminal through the first network transmitter.

7. The method according to claim 6, wherein the first main program further comprises an audio encoder; and
after the establishing the network connection, the method further comprises:
obtaining sound information in the first terminal;
encoding the sound information through the audio encoder to obtain encoded sound information;
transmitting the encoded sound information to the second terminal through the first network transmitter.

8. The method according to claim 1, wherein the first main program comprises a first network receiver; and
the receiving the second operation command comprises:
receiving, through the first network receiver, the second operation command from the second terminal through the network connection.

9. An apparatus for running a stand-alone program, configured in a first terminal, the apparatus comprising:
at least one memory configured to store a first main program; and
at least one processor configured to read the first main program and operate as instructed by the first main program, the first main program comprising:
program running code configured to cause the at least one processor to run the stand-alone program in the first main program;
network connecting code configured to cause the at least one processor to establish a network connection to a second terminal through the first main program, the stand-alone program being a multi-player program, in which a first operation object and a second operation object are separately controlled by a first operation command and a second operation command, respectively, the second operation object being different from the first operation object;
network transmitting code configured to cause the at least one processor to transmit image information of the stand-alone program to the second terminal through the network connection;
receiving code configured to cause the at least one processor to receive, through the first main program, a first operation command inputted through an input device of the first terminal, and transmit the first operation command to the stand-alone program through the first main program; and
network receiving code configured to cause the at least one processor to receive, through the first main program, the second operation command, with respect to the multi-player program currently running on the first terminal, from the second terminal through the network connection, and transmit the second operation command to the stand-alone program through the first main program, the stand-alone program being configured to control the second operation object according to the second operation command while simultaneously controlling the first operation object in the stand-alone program according to the first operation command.

10. The apparatus according to claim 9, wherein the first main program is logged in to with a first account, the first account having a corresponding friend list; and the network connecting code is further configured to cause the at least one processor to display the friend list in the first terminal, receive a selection operation on the friend list, determine a second account corresponding to a selected social friend; and establish the network connection between the first terminal and the second terminal logged in to a second main program with the second account.

11. The apparatus according to claim 9, wherein the network connecting code is further configured to cause the at least one processor to perform one of the following operations:
  establishing a direct peer-to-peer connection between the first terminal and the second terminal; and
  establishing, through a relay server, the network connection between the first terminal and the second terminal.

12. The apparatus according to claim 10, wherein the first main program further comprises:
  display code configured to cause the at least one processor to display, in the first terminal, a multi-player interface of the first main program, the multi-player interface comprising an avatar and a name of the first account and an avatar and a name of the second account.

13. The apparatus according to claim 9, wherein the first main program comprises a first operation command translator and a stand-alone program controller; and
  the network receiving code is further configured to cause the at least one processor to deserialize a serialized second operation command through the first operation command translator to obtain a deserialized second operation command, and transmit the deserialized second operation command to the stand-alone program through the stand-alone program controller.

14. The apparatus according to claim 9, wherein the first main program comprises a video encoder and a first network transmitter; and
  the network transmitting code is further configured to cause the at least one processor to obtain the image information in a display interface of the first terminal, encode the image information through the video encoder to obtain encoded image information, and transmit the encoded image information to the second terminal through the first network transmitter.

15. The apparatus according to claim 14, wherein the first main program further comprises:
  an audio encoder configured to cause the at least one processor to encode sound information in the first terminal to obtain encoded sound information, and transmit the encoded sound information to the second terminal through the first network transmitter.

16. The apparatus according to claim 9, wherein the first main program comprises:
  a first network receiver configured to cause the at least one processor to receive, through the first network receiver, the second operation command from the second terminal through the network connection.

17. An apparatus for running a stand-alone program, configured in a second terminal, the apparatus comprising:
  at least one memory configured to store a second main program; and
  at least one processor configured to read the second main program and operate as instructed by the second main program, the second main program comprising:
  network connecting code configured to cause the at least one processor to establish a network connection to a first terminal through the second main program;
  network receiving code configured to cause the at least one processor to receive, through the second main program, image information of the stand-alone program that is from the first terminal through the network connection, the stand-alone program being a multi-player program, in which a first operation object and a second operation object are separately controlled by a first operation command and a second operation command, respectively, the second operation object being different from the first operation object;
  display code configured to cause the at least one processor to display the image information through the second main program; and
  network transmitting code configured to cause the at least one processor to receive, through the second main program, the second operation command, with respect to the multi-player program currently running on the first terminal, inputted through an input device of the second terminal, and transmit the second operation command to the first terminal through the second main program while the first operation object is simultaneously being controlled in the stand-alone program according to the first operation command.

18. The apparatus according to claim 17, wherein the second main program comprises a second operation command translator and a second network transmitter; and
  the network transmitting code is further configured to cause the at least one processor to serialize the second operation command through the second operation command translator to obtain a serialized second operation command, and transmit the serialized second operation command to the first terminal through the second network transmitter.

19. A terminal, comprising:
  one or more memories configured to store instructions; and
  one or more processors configured to load and execute the instructions to perform the method according to claim 1.

20. A non-transitory computer-readable storage medium, storing at least one computer-readable instruction, the at least one computer-readable instruction being executable by at least one processor to perform the method according to claim 1.

* * * * *